(12) United States Patent
Sawhney

(10) Patent No.: US 11,599,504 B2
(45) Date of Patent: Mar. 7, 2023

(54) EXECUTING A CONDITIONAL COMMAND ON AN OBJECT STORED IN A STORAGE SYSTEM

(71) Applicant: Oracle International Corporation, Redwood Shores, CA (US)

(72) Inventor: Aditya Sawhney, Erie, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/836,219

(22) Filed: Jun. 9, 2022

(65) Prior Publication Data

US 2022/0318193 A1  Oct. 6, 2022

Related U.S. Application Data

(63) Continuation of application No. 17/088,879, filed on Nov. 4, 2020, now Pat. No. 11,386,045, which is a (Continued)

(51) Int. Cl.
*G06F 16/16* (2019.01)
*G06F 16/18* (2019.01)
(Continued)

(52) U.S. Cl.
CPC .......... *G06F 16/162* (2019.01); *G06F 16/164* (2019.01); *G06F 16/1873* (2019.01); *G06F 16/2329* (2019.01); *G06F 16/907* (2019.01)

(58) Field of Classification Search
None
See application file for complete search history.

(56) References Cited

U.S. PATENT DOCUMENTS

| 5,544,347 A | 8/1996 | Yanai et al. |
| 5,657,453 A | 8/1997 | Taoka et al. |

(Continued)

FOREIGN PATENT DOCUMENTS

| CN | 1833232 A | 9/2006 |
| CN | 101097556 A | 1/2008 |

(Continued)

OTHER PUBLICATIONS

Silberschatz et al. "Operating System Concepts, 8th Edition". John Wiley & Sons. Jul. 29, 2008. ISBN-13: 978-0-470-12872-5. Accessed Aug. 2019. (Year: 2008).

*Primary Examiner* — Irene Baker
(74) *Attorney, Agent, or Firm* — Invoke

(57) ABSTRACT

Each object is associated with one root metadata record and one or more version-specific metadata records, each corresponding to a version of object data. A conditional command may be conditioned upon whether an object is stored in a storage system. Whether the condition is satisfied is determined based on whether a root metadata record of the object exists. If the condition is satisfied, then metadata is updated to reflect execution of the conditional command. A conditional command may be conditioned upon whether a data version identifier or a metadata version identifier equals a particular value. A conditional command execution engine retrieves the relevant version identifier from a version-specific metadata record, and performs a check on whether the condition is satisfied. If the condition is satisfied, the engine ensures that the version-specific record has not been modified during the check, and updates metadata to reflect execution of the conditional command.

20 Claims, 19 Drawing Sheets

Related U.S. Application Data continuation of application No. 15/336,473, filed on Oct. 27, 2016, now Pat. No. 10,860,534.

(51) Int. Cl.
*G06F 16/23* (2019.01)
*G06F 16/907* (2019.01)

(56) References Cited

U.S. PATENT DOCUMENTS

| | | |
|---|---|---|
| 6,108,748 A | 8/2000 | Ofek et al. |
| 6,157,612 A | 12/2000 | Weerackody et al. |
| 6,460,052 B1 | 10/2002 | Thomas et al. |
| 6,604,116 B1 | 8/2003 | Gupta |
| 6,714,553 B1 | 3/2004 | Poole et al. |
| 7,035,971 B1 | 4/2006 | Merchant |
| 7,245,624 B2 | 7/2007 | Kramer et al. |
| 7,263,593 B2 | 8/2007 | Honda et al. |
| 7,421,458 B1 * | 9/2008 | Taylor .................. G06F 16/289 707/999.203 |
| 7,707,151 B1 | 4/2010 | Blumenau et al. |
| 8,484,162 B2 | 7/2013 | Prahlad et al. |
| 8,521,973 B2 | 8/2013 | Rowan et al. |
| 8,627,319 B1 | 1/2014 | Jia |
| 8,645,737 B2 | 2/2014 | Saika |
| 8,973,034 B1 | 3/2015 | Harvey et al. |
| 9,037,538 B2 | 5/2015 | Sampathkumar |
| 9,396,287 B1 | 7/2016 | Bhave et al. |
| 9,501,507 B1 | 11/2016 | Harris et al. |
| 9,507,818 B1 | 11/2016 | Stefani et al. |
| 9,507,843 B1 | 11/2016 | Madhavarapu et al. |
| 9,524,302 B2 | 12/2016 | Regni et al. |
| 9,547,459 B1 | 1/2017 | Benhanokh et al. |
| 9,720,989 B2 | 8/2017 | Theimer et al. |
| 9,740,565 B1 | 8/2017 | Mitra et al. |
| 9,798,754 B1 | 10/2017 | Shilane et al. |
| 9,811,529 B1 | 11/2017 | Rus et al. |
| 9,846,655 B1 | 12/2017 | Zhao et al. |
| 9,864,774 B2 | 1/2018 | Marcotte |
| 10,229,150 B2 | 3/2019 | Marquardt et al. |
| 10,346,360 B1 | 7/2019 | Basov |
| 2001/0016843 A1 | 8/2001 | Olson et al. |
| 2002/0143494 A1 | 10/2002 | Conrad |
| 2004/0153458 A1 | 8/2004 | Noble et al. |
| 2004/0215589 A1 | 10/2004 | Boyd et al. |
| 2005/0010504 A1 | 1/2005 | Gebhard et al. |
| 2005/0049945 A1 | 3/2005 | Bourbonnais et al. |
| 2005/0131964 A1 | 6/2005 | Saxena |
| 2006/0041593 A1 | 2/2006 | Borthakur et al. |
| 2006/0072400 A1 | 4/2006 | Anderson et al. |
| 2006/0095481 A1 | 5/2006 | Singh et al. |
| 2006/0106825 A1 | 5/2006 | Matthew |
| 2006/0190643 A1 | 8/2006 | Kedem et al. |
| 2006/0218558 A1 | 9/2006 | Torii et al. |
| 2006/0271420 A1 | 11/2006 | Anselmann et al. |
| 2007/0043790 A1 | 2/2007 | Kryger |
| 2007/0162441 A1 * | 7/2007 | Idicula .................. G06F 40/197 707/999.005 |
| 2007/0192229 A1 | 8/2007 | Rowan |
| 2007/0239944 A1 | 10/2007 | Rupanagunta et al. |
| 2007/0266394 A1 | 11/2007 | Odent et al. |
| 2008/0005146 A1 | 1/2008 | Kubo et al. |
| 2008/0162610 A1 | 7/2008 | Rossmann et al. |
| 2009/0043978 A1 | 2/2009 | Sawdon et al. |
| 2009/0059017 A1 | 3/2009 | Kurokawa |
| 2010/0049938 A1 | 2/2010 | Izumi et al. |
| 2010/0162249 A1 | 6/2010 | Shpeisman et al. |
| 2010/0205160 A1 | 8/2010 | Kumar et al. |
| 2010/0257995 A1 | 10/2010 | Kamiya |
| 2010/0280991 A1 | 11/2010 | Chen et al. |
| 2010/0322475 A1 | 12/2010 | Ikeda |
| 2011/0013631 A1 | 1/2011 | Frydman et al. |
| 2011/0016353 A1 | 1/2011 | Mikesell et al. |
| 2011/0119100 A1 | 5/2011 | Ruhl et al. |
| 2011/0164614 A1 | 7/2011 | Begeja |
| 2011/0196900 A1 | 8/2011 | Drobychev et al. |
| 2011/0246429 A1 | 10/2011 | Prahlad et al. |
| 2011/0298520 A1 | 12/2011 | Masson |
| 2012/0072412 A1 | 3/2012 | Bestgen et al. |
| 2012/0191724 A1 | 7/2012 | Tucek et al. |
| 2012/0204007 A1 | 8/2012 | Reid |
| 2012/0254116 A1 | 10/2012 | Thereska et al. |
| 2012/0259863 A1 | 10/2012 | Bodwin et al. |
| 2012/0278553 A1 | 11/2012 | Mudhiganti et al. |
| 2012/0303913 A1 | 11/2012 | Kathmann et al. |
| 2012/0311586 A1 | 12/2012 | Inagaki |
| 2013/0290249 A1 | 10/2013 | Merriman et al. |
| 2013/0311422 A1 | 11/2013 | Walker et al. |
| 2013/0311555 A1 | 11/2013 | Laoutaris et al. |
| 2013/0326055 A1 | 12/2013 | Chatterjee et al. |
| 2014/0040199 A1 | 2/2014 | Golab et al. |
| 2014/0122022 A1 | 5/2014 | Chen et al. |
| 2014/0180461 A1 | 6/2014 | Heck et al. |
| 2014/0188868 A1 | 7/2014 | Hunter et al. |
| 2014/0189270 A1 | 7/2014 | Iwanicki et al. |
| 2014/0195510 A1 | 7/2014 | Jourdan et al. |
| 2014/0207820 A1 | 7/2014 | Lee |
| 2014/0250281 A1 | 9/2014 | Rao et al. |
| 2014/0280986 A1 | 9/2014 | Baulier et al. |
| 2015/0052295 A1 | 2/2015 | Danilak et al. |
| 2015/0088940 A1 | 3/2015 | Stokely et al. |
| 2015/0112836 A1 | 4/2015 | Godsey et al. |
| 2015/0134796 A1 | 5/2015 | Theimer et al. |
| 2015/0172412 A1 | 6/2015 | Escriva et al. |
| 2015/0220558 A1 | 8/2015 | Snibbe et al. |
| 2015/0234897 A1 | 8/2015 | Kuninobu et al. |
| 2015/0254257 A1 | 9/2015 | Kritchko et al. |
| 2015/0278092 A1 | 10/2015 | Smentek et al. |
| 2015/0278109 A1 | 10/2015 | Vahidsafa et al. |
| 2015/0302432 A1 | 10/2015 | Chien et al. |
| 2015/0339314 A1 | 11/2015 | Collins et al. |
| 2015/0355824 A1 | 12/2015 | Ueno |
| 2015/0363271 A1 | 12/2015 | Haustein et al. |
| 2015/0370505 A1 | 12/2015 | Shuma et al. |
| 2016/0006673 A1 | 1/2016 | Thomas et al. |
| 2016/0026409 A1 | 1/2016 | Tanaka et al. |
| 2016/0105370 A1 | 4/2016 | Mellor et al. |
| 2016/0202693 A1 | 7/2016 | Noda et al. |
| 2016/0210302 A1 | 7/2016 | Feng |
| 2016/0255139 A1 | 9/2016 | Rathod |
| 2016/0275150 A1 | 9/2016 | Bournonnais et al. |
| 2016/0306822 A1 | 10/2016 | Waghulde |
| 2016/0335550 A1 | 11/2016 | Achin et al. |
| 2016/0342486 A1 | 11/2016 | Kedem et al. |
| 2017/0052717 A1 | 2/2017 | Rawat et al. |
| 2017/0351543 A1 | 12/2017 | Kimura |
| 2017/0371887 A1 | 12/2017 | Balasubramanian et al. |
| 2018/0004560 A1 | 1/2018 | Shankar et al. |
| 2018/0075069 A1 | 3/2018 | Guim et al. |
| 2018/0095961 A1 | 4/2018 | Deluca et al. |

FOREIGN PATENT DOCUMENTS

| | | |
|---|---|---|
| CN | 101743546 A | 6/2010 |
| CN | 102200932 A | 9/2011 |
| CN | 102096410 B | 6/2012 |
| CN | 103562879 A | 2/2014 |
| CN | 103620580 A | 3/2014 |
| CN | 103678442 A | 3/2014 |
| CN | 103678471 A | 3/2014 |
| CN | 103678573 A | 3/2014 |
| CN | 105359017 A | 2/2016 |
| CN | 105637491 A | 6/2016 |
| CN | 105745627 A | 7/2016 |
| EP | 2821914 A1 | 1/2015 |
| GB | 2395033 B | 12/2005 |
| JP | 3208236 B2 | 9/2001 |
| KR | 10-2015-0088531 A | 8/2015 |
| WO | 01/16728 A2 | 3/2001 |

* cited by examiner

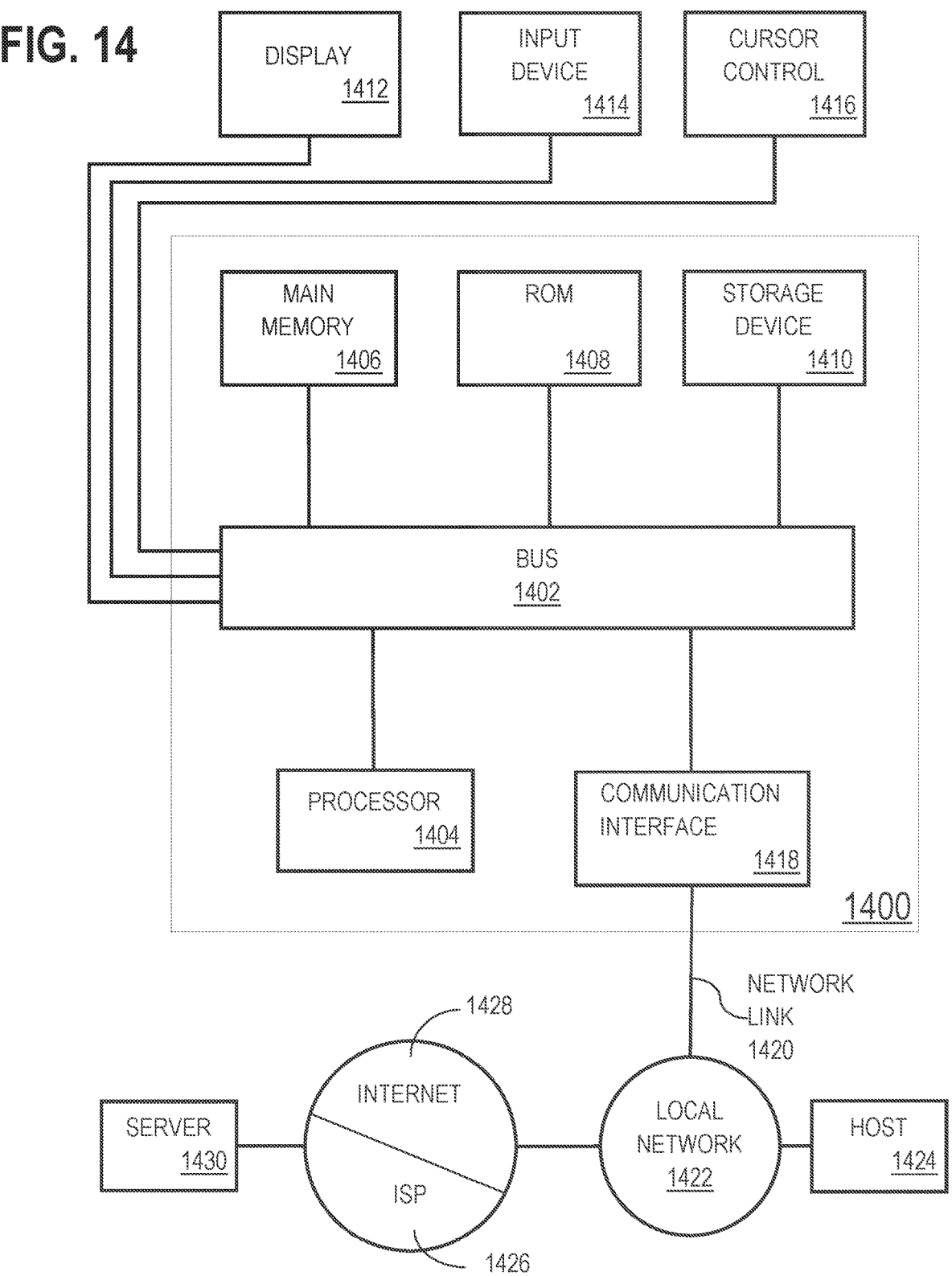

EXECUTING A CONDITIONAL COMMAND ON AN OBJECT STORED IN A STORAGE SYSTEM

INCORPORATION BY REFERENCE; DISCLAIMER

The following application is hereby incorporated by reference: application Ser. No. 17/088,879 filed on Nov. 4, 2020; application Ser. No. 15/336,473 filed on Oct. 27, 2016. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to objects stored in a storage system. In particular, the present disclosure relates to executing a conditional command on an object stored in a storage system.

BACKGROUND

Storage systems store objects according to various corresponding storage architectures. Examples of storage architectures include an object storage, a file system, a block storage, and/or a database.

Each object is associated with data and metadata. Data (also referred to herein as "object data") includes, for example, information that is used by an end user and/or a business application. As an example, data for a Sales Application may include information about customers, products, and sales. As another example, data for a Human Resources Application may include information about employees, departments, and salaries. Metadata describes how the data is set up and/or stored. Additionally or alternatively, metadata describes characteristics about the data itself. Metadata may be used to manipulate and/or manage the objects in a storage system.

Concurrent access of a storage system refers to accessing the storage system using multiple threads at the same time. Each thread may perform operations, for example, in response to a request by a different client (such as a user and/or an application). A collision may occur if two or more threads attempt to access the same entry of the storage system at the same time.

Concurrency control ensures that a storage system returns a desired and/or expected result for concurrent access operations. Concurrency control may be implemented through the use of an atomic transaction. An atomic transaction, performed by a particular thread, is a transaction that cannot be partially completed. An atomic transaction is successful if fully completed and fails if not completed. No other thread can interfere with the atomic transaction performed by a particular thread while the atomic transaction is in progress. Hence, an atomic transaction on a particular entry of a storage system must complete before another atomic transaction may operate on the particular entry. Some storage systems, such as NoSQL databases, support atomic transactions over only a single row, or a single shard.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 14 shows a block diagram that illustrates a computer system in accordance with one or more embodiments.

DETAILED DESCRIPTION

Figure 1:
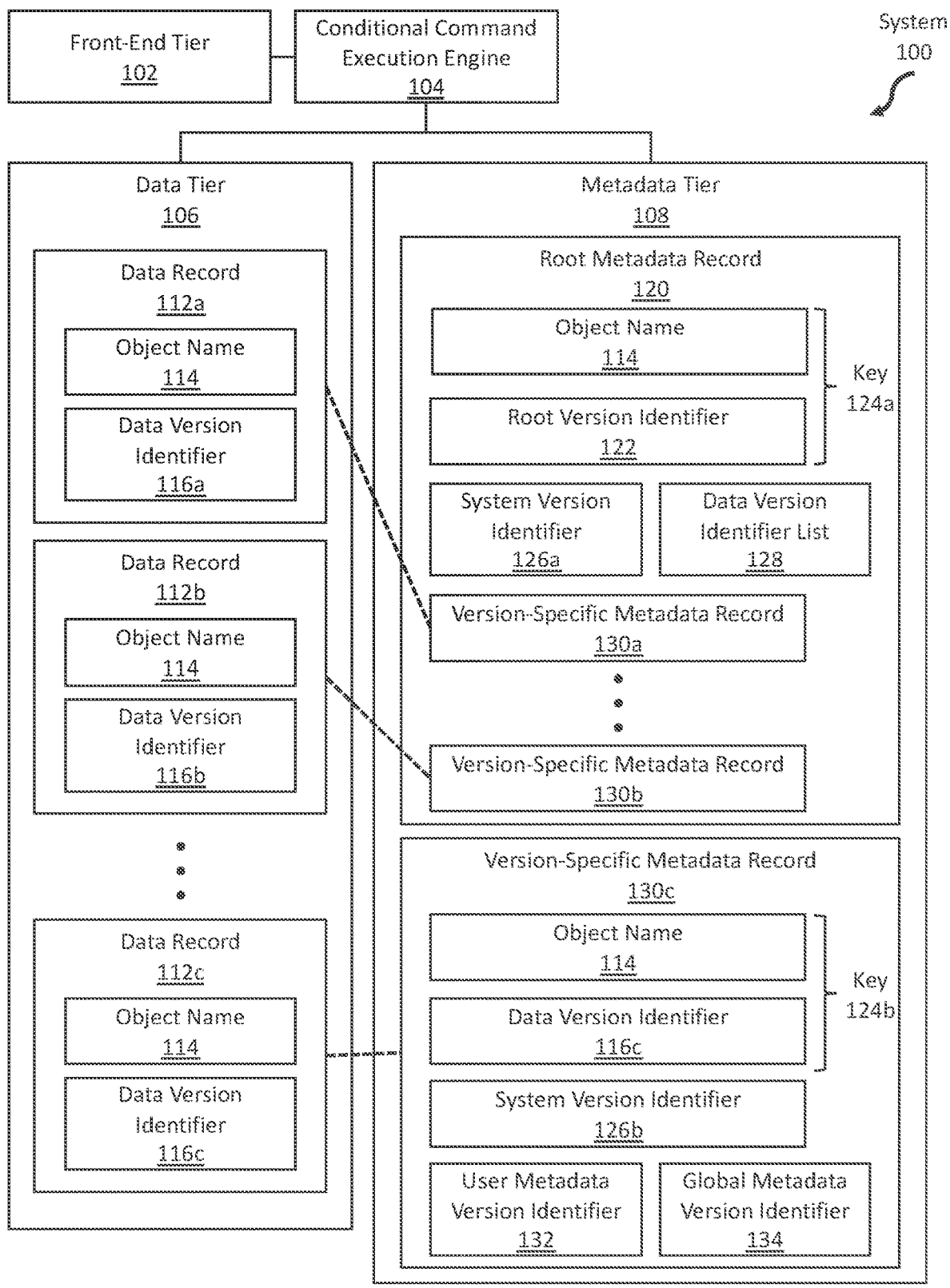
FIG. 1 illustrates a system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
1. GENERAL OVERVIEW
2. CONDITIONAL COMMAND EXECUTION SYSTEM ARCHITECTURE
3. EXECUTING A CONDITIONAL COMMAND ON AN OBJECT IN A STORAGE SYSTEM
4. MISCELLANEOUS; EXTENSIONS
5. HARDWARE OVERVIEW

1. GENERAL OVERVIEW

One or more embodiments include executing a conditional command to store a particular version of object data of an object in a data tier of a storage system. The conditional command instructs a storage system to store the particular version of the object data in the data tier if the object is not currently stored in the storage system. A conditional command execution engine (CCEE) determines whether the object is stored in the storage system by determining whether a root metadata record, corresponding to the object, is stored in the metadata tier of the storage system. A "root metadata record" of an object refers to a metadata record that is accessed via a key comprising: (a) the object name of the object, and (b) a root version identifier. The root version identifier is an identifier that is common to all root metadata records in the storage system. A single root metadata record is stored for an object, regardless of how many versions of object data corresponding to the object are stored in the data tier. If the CCEE determines that the root metadata record of the object is not stored in the metadata tier of the storage system, then the CCEE generates and stores the root metadata record in the metadata tier of the storage system. Additionally the CCEE stores the particular version of object data, specified in the conditional command, in the data tier of the storage system. Alternatively, if the root metadata record is already stored in the metadata tier of the storage system, then the particular version of object data is not stored in data tier of the storage system.

One or more embodiments include executing a conditional command to store a particular version of object data of an object in a data tier of the storage system, if at least one version of object data of the object is currently stored in the storage system. A CCEE determines whether at least one version of the object is stored in the storage system by determining whether a root metadata record, corresponding to the object, is stored in metadata tier of the storage system. As described above, a "root metadata record" of an object refers to a metadata record that is accessed via a key comprising: (a) the object name of the object, and (b) a root version identifier. A root metadata record includes a data version identifier of a current version of object data of an object that is stored in the data tier of the storage system. A data version identifier is an identifier that is updated for each version of object data that is stored in the data tier of the storage system. If the CCEE determines that the root metadata record of the object is stored in the metadata tier of the storage system, then the CCEE updates the root metadata record with a new data version identifier. The new data version identifier corresponds to the particular version of object data to be stored in the storage system. Additionally, the CCEE stores the particular version of object data in the storage system. However, if the root metadata record is not stored in the metadata tier of the storage system, then the particular version of object data is not stored in the data tier of the storage system.

One or more embodiments include executing a conditional command to store a particular version of object data of an object in a data tier of a storage system, if the data version identifier of a current version of object data is equal to a particular value specified by the conditional command. As described above, a "root metadata record" of an object refers to a metadata record that is accessed via a key comprising: (a) the object name of the object, and (b) a root version identifier. As described above, a root metadata record includes a data version identifier of a current version of object data of an object. The root metadata record is associated with a system version identifier. The storage system uses the system version identifier to track updates to the root metadata record. Specifically, the storage system updates the system version identifier each time the root metadata record is modified. A CCEE retrieves, from the root metadata record: (a) the data version identifier of the current version of object data of the object and (b) the system version identifier of the root metadata record. The CCEE determines whether the data version identifier of the current version of object data is equal to the particular value specified in the conditional command.

If the data version identifier of the current version of object data is equal to the particular value specified in the conditional command, then the CCEE attempts to store the particular version of object data specified in the conditional command. The CCEE attempts storing the particular version of object data by checking if the system version identifier of the root metadata record remains unchanged since the retrieving operation. If the system version identifier of the root metadata record remains unchanged, then the CCEE updates the root metadata record with a new data version identifier corresponding to the particular version of object data to be stored in the storage system. Additionally, the CCEE stores the particular version of object data, specified in the conditional command, in the data tier of the storage system. However, if the system version identifier of the root metadata record has changed since the retrieving operation, then the CCEE does not store the particular version of object data.

One or more embodiments include executing a conditional command to delete a current version of object data of an object from a storage system, if the data version identifier of the current version of object data is equal to a particular value. As described above, a "root metadata record" of an object refers to a metadata record that is accessed via a key comprising: (a) the object name of the object, and (b) a root version identifier. As described above, a root metadata record includes a data version identifier of a current version of object data of an object. As described above, a root metadata record is associated with a system version identifier. A CCEE retrieves, from the root metadata record: (a) the data version identifier of the current version of object data of the object and (b) the system version identifier of the root metadata record. The CCEE determines whether the data version identifier of the current version of object data is equal to the particular value specified in the conditional command.

If the data version identifier of the current version of object data is equal to the particular value specified in the conditional command, then the CCEE attempts to delete the current version of object data. The CCEE attempts deleting the current version of object data by checking if the system version identifier of the root metadata record remains unchanged since the retrieving operation. If the system version identifier of the root metadata record remains unchanged, then the CEE updates the metadata tier for deleting the current version of object data. Additionally, the CCEE deletes the current version of object data from the data tier of the storage system. However, if the system version identifier of the root metadata record has changed since the retrieving operation, then the current version of object data is not deleted.

One or more embodiments include executing a conditional command to store a particular version of metadata in a storage system, if a metadata version identifier of a current version of the metadata is equal to a particular value. The conditional command specifies that the particular version of metadata corresponds to a particular version of object data of an object. As described above, a single root metadata record is stored for all versions of object data of an object. A version-specific metadata record is stored for each version of object data of the object. A CCEE determines, based on the root metadata record, a version-specific metadata record corresponding to the particular version of object data specified in the conditional command. The version-specific metadata record may be embedded in the root metadata record, or may be stored separately from the root metadata record. The CCEE retrieves, from the version-specific metadata record: (a) the metadata version identifier of the current version of the metadata and (b) a system version identifier associated with the version-specific metadata record. The CCEE determines whether the metadata version identifier of the current version of the metadata is equal to the particular value specified in the conditional command.

If the metadata version identifier of the current version of the metadata is equal to the particular value specified in the conditional command, then the CCEE attempts to store the particular version of metadata. The CCEE attempts storing the particular version of metadata by checking if the system version identifier associated with the version-specific metadata record remains unchanged since having been retrieved from the version-specific metadata record. If the system version identifier remains unchanged, then the CCEE updates the version-specific metadata record to store a new metadata version identifier corresponding to the particular version of metadata to be stored in the storage system. Additionally, the CCEE stores the particular version of metadata in the version-specific metadata record. However, if the system version identifier associated with the version-specific metadata record has changed since having been retrieved from the version-specific metadata record, then the particular version of metadata is not stored.

One or more embodiments include executing a conditional command to delete a particular version of object data of an object, if a metadata version identifier of metadata corresponding to the particular version of object data is equal to a particular value. As described above, a single root metadata record is stored for all versions of object data of an object. As described above, a version-specific metadata record is stored for each version of object data of the object. A CCEE determines, based on the root metadata record, a version-specific metadata record corresponding to the particular version of object data specified in the conditional command. The CCEE retrieves, from the version-specific metadata record: (a) the metadata version identifier of the metadata corresponding to the particular version of object data and (b) a system version identifier associated with the version-specific metadata record. The CCEE determines whether the metadata version identifier of the metadata is equal to the particular value specified in the conditional command.

If the metadata version identifier of the metadata is equal to the particular value specified in the conditional command, then the CCEE attempts to delete the particular version of object data. The CCEE attempts deleting the particular version of object data by checking if the system version identifier associated with the version-specific metadata record remains unchanged since having been retrieved from the version-specific metadata record. If the system version identifier remains unchanged, then the CCEE updates the metadata tier for deleting the particular version of object data. Additionally, the CCEE deletes the particular version of object data from the data tier of the storage system. However, if the system version identifier associated with the version-specific metadata record has changed since having been retrieved from the version-specific metadata record, then the particular version of object data is not deleted.

One or more embodiments described in this Specification and/or recited in the claims may not be included in this General Overview section.

2. CONDITIONAL COMMAND EXECUTION SYSTEM OVERVIEW

FIG. 1 illustrates a conditional command execution system 100, in accordance with one or more embodiments. As illustrated in FIG. 1, the system 100 includes a front-end tier 102, a conditional command execution engine (CCEE) 104, a data tier 106, and a metadata tier 108. The data tier 106 and the metadata tier 108 are components of a storage system. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a data tier 106 refers to hardware and/or software configured to store object data associated with objects of a storage system. As illustrated, a data tier 106 includes one or more data records (such as data records 112a-c), each corresponding to a particular version of object data of an object. Each time a new object is created, a new data record is generated for storing the object data of the object. Each time the object data of an object is changed, a new data record is generated for storing the new object data of the object.

In one or more embodiments, a data record (such as data records 112a-c) is associated with an object name (such as object name 114), and a data version identifier (such as data version identifiers 116a-b). Data records for different versions of object data corresponding to a same object are associated with a same object name but different data version identifiers. The data records for a same object include: (a) a current version of object data of the object, and (b) one or more outdated versions of object data of the object. As illustrated, data records 112a-c are associated with a same object name 114 but different data version identifiers 116a-c.

A data version identifier is an identifier of a particular version of object data associated with an object. Each new data record is associated with a new data version identifier.

A data version identifier may be represented in a particular format. In an embodiment, a data version identifier is an integer that is incremented for each new version of object data associated with an object. In another embodiment, a data version identifier is a representation of a time at which a data record is generated. The data version identifier includes of one or more of the following components: an epoch, a physical time, and/or a logical time.

The physical time is derived from the clock of the system. The physical time indicates a time at which an event occurs. As an example, the physical time may indicate a time at which a data record is generated.

The epoch is a time period during which there is no significant change and/or adjustment in the clock of the system. The epoch is incremented every time the clock is changed and/or adjusted. As an example, one epoch may be designated for a time period in which a system clock is set according to Pacific Daylight Time. The epoch may be incremented when the system clock is set according to Pacific Standard Time. As another example, a current time may be Nov. 1, 2016, at 10:00 a.m. However, a clock of a system may be erroneously set to indicate that the current time is Nov. 1, 1916, at 10:00 a.m. An administrator may notice the error and adjust the clock to accurately reflect the current time. One epoch may be designated for the time period prior to the adjustment by the administrator. Another epoch may be designated for the time period subsequent to the adjustment by the administrator.

The logical time is used to identify an ordering of events that occur at the same physical time. As an example, Data Record A and Data Record B may be generated at the same physical time, "12:00:35." Data Record A may be associated with a logical time of "0." Data Record B may be associated with a logical time of "1." The logical time indicates that Data Record A was generated before Data Record B.

In one or more embodiments, a metadata tier 108 refers to hardware and/or software configured to store metadata associated with objects of a storage system. As illustrated, a metadata tier 108 includes one or more root metadata records (such as root metadata record 120). Additionally or alternatively, the metadata tier 108 includes one or more version-specific metadata records (such as version-specific metadata records 130a-c).

In one or more embodiments, a version-specific metadata record includes metadata corresponding to a particular version of object data of an object. Each time a new object is created, a new version-specific metadata record is generated for storing the metadata of the object. Each time the object data of an object is changed, a new version-specific metadata record is generated for storing the metadata associated with the new object data of the object.

Each time the metadata corresponding to a particular version of object data of an object is changed, the existing metadata record for the particular version of object data is overwritten with new metadata. The metadata may change due to a user request and/or a system request. User requests may be received from a user via a user interface and/or application programming interface (API). System requests may be received from an application and/or a process. As an example, metadata associated with an object may include a flag indicating whether a transaction event record of the object has been published. After publishing a particular transaction event record, a publisher may request that the flag associated with the particular transaction event record become marked. The request from the publisher is an example of a system request to modify the metadata of the object.

As described above, each data record includes a particular version of object data of an object. Further as described above, each version-specific metadata record includes metadata corresponding to a particular version of object data of an object. Hence, there is a one-to-one mapping between data records and version-specific metadata records. A version-specific metadata record may include a pointer and/or a reference to a data record corresponding to the version-specific metadata record. As illustrated, version-specific metadata record 130a corresponds to data record 112a. Version-specific metadata record 130b corresponds to data record 112b. Version-specific metadata record 130c corresponds to data record 112c.

In one or more embodiments, a version-specific metadata record (such as version-specific metadata records 130a-c) is associated with an object name 114, a data version identifier 116c, a user metadata version identifier 132, and a global metadata version identifier 134. A version-specific metadata record is associated with the same object name and the same data version identifier as the data record corresponding to the version-specific metadata record. As illustrated, version-specific metadata record 130c and data record 112c are associated with a same object name 114 and a same data version identifier 116c.

A user metadata version identifier 132 is an identifier of a particular version of metadata corresponding to a particular version of object data an object. The user metadata version identifier 132 is updated every time the metadata is changed in response to a user request. A user metadata version identifier 132 may be represented in a particular format. As an example, a user metadata version identifier may be represented as an integer. A newly generated metadata record may be associated with a user metadata version identifier of "0." The user metadata version identifier may be incremented by one on every user-initiated change to the metadata.

A global metadata version identifier 134 is an identifier of a particular version of metadata corresponding to a particular version of object data an object. The global metadata version identifier 134 is updated every time the metadata is changed in response to a user request and/or a system request. A global metadata version identifier 134 may be represented in a particular format. As an example, a global metadata version identifier may be represented as an integer. As another example, a global metadata version identifier may be a representation of a time at which the metadata record is generated and/or changed. The global metadata version identifier may include: (a) an epoch, (b) a physical time, and (c) a logical time.

In one or more embodiments, a version-specific metadata record (such as version-specific metadata records 130a-b) may be embedded within a root metadata record 120, as further described below. Additionally or alternatively, a version-specific metadata record (such as version-specific metadata record 130c) may be stored separately from a root metadata record 120. An embedded version-specific metadata record and a non-embedded version-specific metadata record may include similar information, such as an object name, a data version identifier, a user metadata version identifier, and a global metadata version identifier. An embedded version-specific metadata record and a non-embedded version-specific metadata record may be similarly structured and/or organize information according to a similar schema. A single object may be associated with one or more version-specific metadata records that are embedded within a root metadata record and/or one or more version-specific metadata records that are stored separately from a root metadata record.

In one or more embodiments, a root metadata record 120 maintains metadata that is common to all versions of object data of an object. A single root metadata record 120 is stored for an object, regardless of how many versions of object data corresponding to the object.

In one or more embodiments, a root metadata record 120 is associated with an object name 114, a root version identifier 122, and a data version identifier list 128.

A root version identifier 122 is an identifier corresponding to all root metadata record stored within a storage system. A root version identifier 122 is the same identifier for root metadata records corresponding to different objects. A root version identifier 122 may be represented in a particular format. As an example, a root version identifier may be the integer "0."

A data version identifier list 128 includes data version identifiers corresponding to all version of object data of the object. As illustrated, data records 112a-c includes versions of object data corresponding to an object associated with the object name 114. The root metadata record 120 corresponds to the object associated with the object name 114. The root metadata record 120 includes a data version identifier list 128. The data version identifier list 128 includes data version identifiers 116a-c associated with data records 112a-c, respectively. In other embodiments, a data version identifier list 128 includes at least a data version identifier corresponding to a current version of object data of the object.

In one or more embodiments, the root metadata record 120 is associated with a maximum number of embedded metadata records that may be stored within the root metadata record 120. If a number of version-specific metadata records embedded in the root metadata record 120 has reached the maximum number, then additional version-specific metadata records are stored separately from the root metadata record 120. In an embodiment, the most current version-specific metadata records are embedded within the root metadata record 120. The earliest version-specific metadata records are stored separately from the root metadata record 120.

In one or more embodiments, the metadata tier 108 includes a plurality of entries. The plurality of entries may be, for example, a plurality of rows of one or more tables. Embedding a version-specific metadata record within a root metadata record 120 refers to storing the root metadata record 120 and the embedded version-specific metadata record in a same entry within the metadata tier 108. Storing a version-specific metadata record separately from a root metadata record 120 refers to storing the root metadata record 120 and the version-specific metadata record in different entries within the metadata tier 108. Further, each version-specific metadata record that is stored separately from a root metadata record 120 is stored in a different entry within the metadata tier 108.

Each entry within the metadata tier 108 is accessed using a different key (such as keys 124a-b). As an example, each row of a table within a metadata tier is accessed using a different key. A key is a unique identifier used to identify a particular entry within the metadata tier 108. A key 124a of a root metadata record 120 includes an object name 114 of the object and a root version identifier 122. The key 124a is used to access the root metadata record 120 and any embedded version-specific metadata records 130a-b. A key 124b of a non-embedded version-specific metadata record 130c, corresponding to a version of object data that is associated with a particular data version identifier 116c, includes an object name 114 of the object and the particular data version identifier 116c. A different key is used to access each non-embedded version-specific metadata record corresponding to a same object.

As illustrated, for example, the root metadata record 120 is accessed using the key 124a. The embedded version-specific metadata records 130a-b are accessed using the same key 124a. The version-specific metadata record 130c that is stored separately from the root metadata record 120 is accessed using a different key 124b.

Each entry within the metadata tier 108 is associated with a system version identifier (such as system version identifiers 126a-b). As illustrated, the root metadata record 120 is stored in a particular entry and is associated with a particular system version identifier 126a. The non-embedded version-specific metadata record 130c is stored in a different entry and is associated with a different system version identifier 126b. The storage system uses a system version identifier to track updates to the associated entry within the metadata tier 108. A system version identifier is modified each time that the corresponding entry of the metadata tier 108 is modified.

In one or more embodiments, the entries within the metadata tier 108 are grouped into a plurality of shards. A shard may include, for example, a particular set of rows of a table. The root metadata record and version-specific metadata records corresponding to a same object are stored in a same shard.

In one or more embodiments, the metadata tier 108 supports atomic transactions over only a single row, or a single shard. Operations affecting a single row, or rows of a single shard, may be completed in a single atomic transaction. Operations affecting multiple rows of multiple shards cannot be completed in a single atomic transaction. As described above, an atomic transaction, performed by a particular thread, is a transaction that cannot be partially completed. An atomic transaction is successful if fully completed and fails if not completed. No other thread can interfere with the atomic transaction performed by a particular thread while the atomic transaction is in progress. Hence, an atomic transaction on a particular entry of a storage system must complete before another atomic transaction may operate on the particular entry. As an example, a read-modify-write transaction is a type of atomic transaction that both reads a memory location and writes a new value into the same memory location simultaneously. The new value may be determined based on the original value stored in the memory location, or may be determined independent of the original value stored in the memory location.

In one or more embodiments, the data tier 106 and/or the metadata tier 108 are implemented using one or more data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as a CCEE 104. Alternatively or additionally, a data repository may be implemented or executed on a computing system separate from a CCEE 104. A data repository may be communicatively coupled to a CCEE 104 via a direct connection or via a network.

In one or more embodiments, a front-end tier 102 refers to hardware and/or software configured to expose a user interface and/or an application programming interface (API) for receiving conditional commands. The API may conform to a Representational State Transfer (REST) architectural style. The conditional commands may include but are not limited to:
  (a) storing a particular version of object data of an object in a storage system, if the object is not currently stored in the storage system;
  (b) storing a particular version of object data of an object in a storage system, if the object is currently stored in the storage system;
  (c) storing a particular version of object data of an object in a storage system, if the data version identifier of a current version of object data is equal to a particular value;
  (d) deleting a current version of object data of an object from a storage system, if the data version identifier of the current version of object data is equal to a particular value, in accordance with one or more embodiments;
  (e) storing a particular version of metadata in a storage system, if a metadata version identifier of a current version of the metadata is equal to a particular value; and
  (f) deleting a particular version of object data of an object from a storage system, if a metadata version identifier of metadata corresponding to the particular version of object data is equal to a particular value.

In one or more embodiments, a CCEE 104 refers to hardware and/or software configured to execute a conditional command received by the front-end tier 102. The CCEE 104 executes the conditional command on the metadata tier 108 and/or the data tier 106. Examples of operations for executing conditional commands are described below with reference to FIGS. 2-13.

In an embodiment, the front-end tier 102 and/or the CCEE 104 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant ("PDA").

3. EXECUTING A CONDITIONAL COMMAND ON AN OBJECT IN A STORAGE SYSTEM

Figure 2:
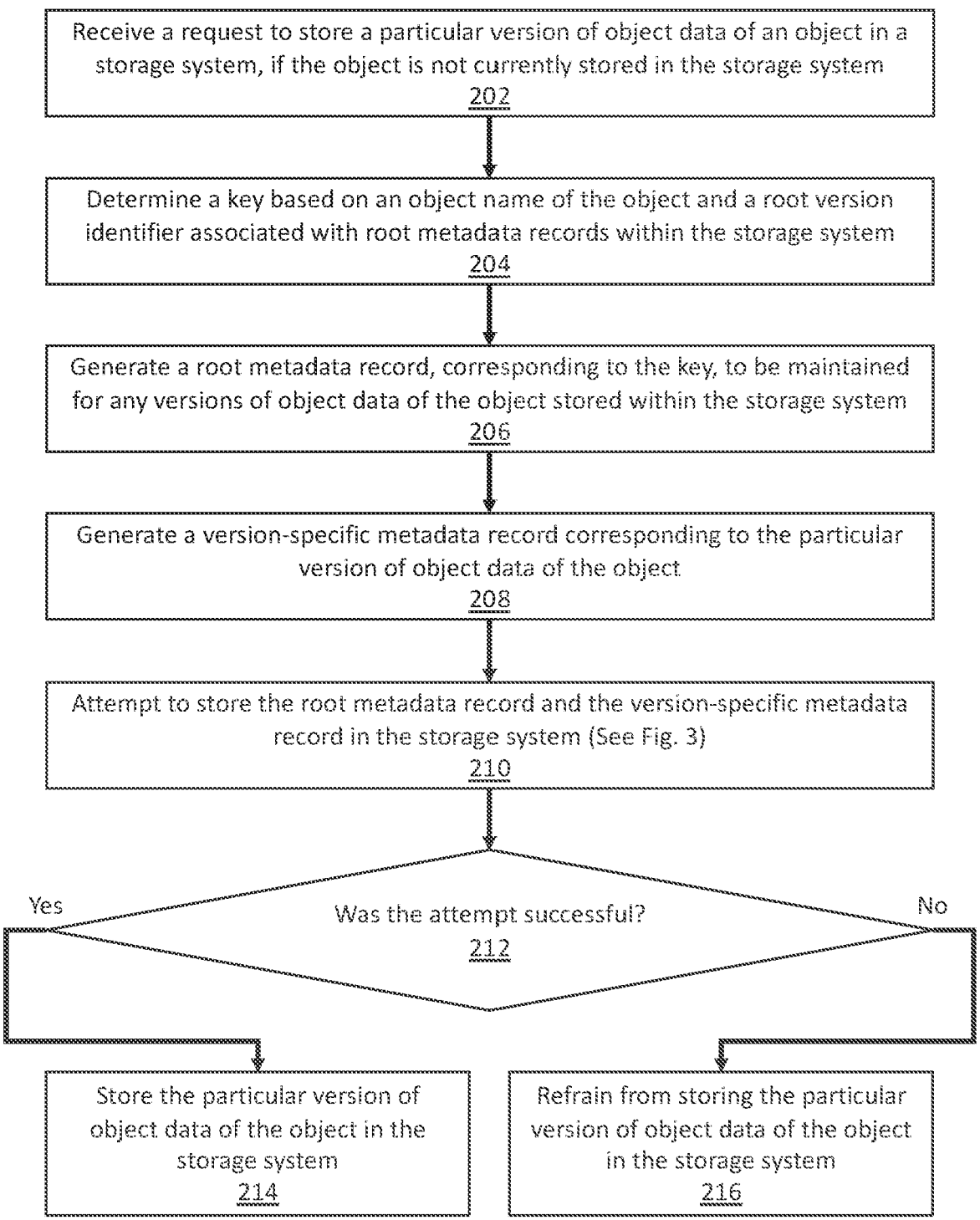
FIG. 2 illustrates an example set of operations for executing a conditional command to store a particular version of object data of an object in a storage system, if the object is not currently stored in the storage system, in accordance with one or more embodiments.

A. Storing a Particular Version of Object Data of an Object, if the Object is not Currently Stored in the Storage System FIG. 2 illustrates an example set of operations for executing a conditional command to store a particular version of object data of an object in a storage system, if the object is not currently stored in the storage system, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include receiving a request to store a particular version of object data of an object in a storage system, if the object is not currently stored in the storage system (Operation 202). A CCEE 104 receives the request from a front-end tier. The front-end tier exposes a user interface and/or an application programming interface (API) for receiving the request. The request may be generated by a user and/or a system.

The request includes the particular version of object data to be stored. Additionally, the request includes an object name of the object corresponding to the particular version of object data.

One or more embodiments include determining a key based on an object name of the object and a root version identifier associated with root metadata records within the storage system (Operation 204). The CCEE 104 determines a key corresponding to the root metadata record of the object. The key is used for accessing the root metadata record of the object, if the root metadata record is currently stored in the storage system.

The key includes the object name of the object, which is specified in the request received at Operation 202. The key also includes the root version identifier. In other embodiments, the key may be determined based on a function and/or transformation applied to the object name and the root version identifier. As an example, the key may be a hash of the object name and the root version identifier. As another example, the key may be a compressed version of the object name and the root version identifier.

One or more embodiments include generating a root metadata record, corresponding to the key, to be maintained for any versions of object data of the object stored within the storage system (Operation 206). The CCEE 104 generates the root metadata record in a memory storage (such as, a random-access memory (RAM)) associated with the CCEE 104. The root metadata record is associated with the object name and the root version identifier. Additionally or alternatively, the root metadata record includes a data version identifier list. The data version identifier list includes one data version identifier. The data version identifier corresponds to the particular version of object data specified in the request received at Operation 202.

One or more embodiments include generating a version-specific metadata record corresponding to the particular version of object data of the object (Operation 208). The CCEE 104 generates the version-specific metadata record in a memory storage (such as, a random-access memory (RAM)) associated with the CCEE 104. The version-specific metadata record includes metadata corresponding to the particular version of object data specified in the request received at Operation 202. The metadata may include, for example, a creation time of the version-specific metadata record, a user who submitted the request received at Operation 202, an application that generated the request received at Operation 202, a transaction history associated with the object, and/or a state associated with the object.

In an embodiment, the CCEE 104 generates a root metadata record that includes an embedded version-specific metadata record. The root metadata record includes the version-specific metadata record.

Figure 3:
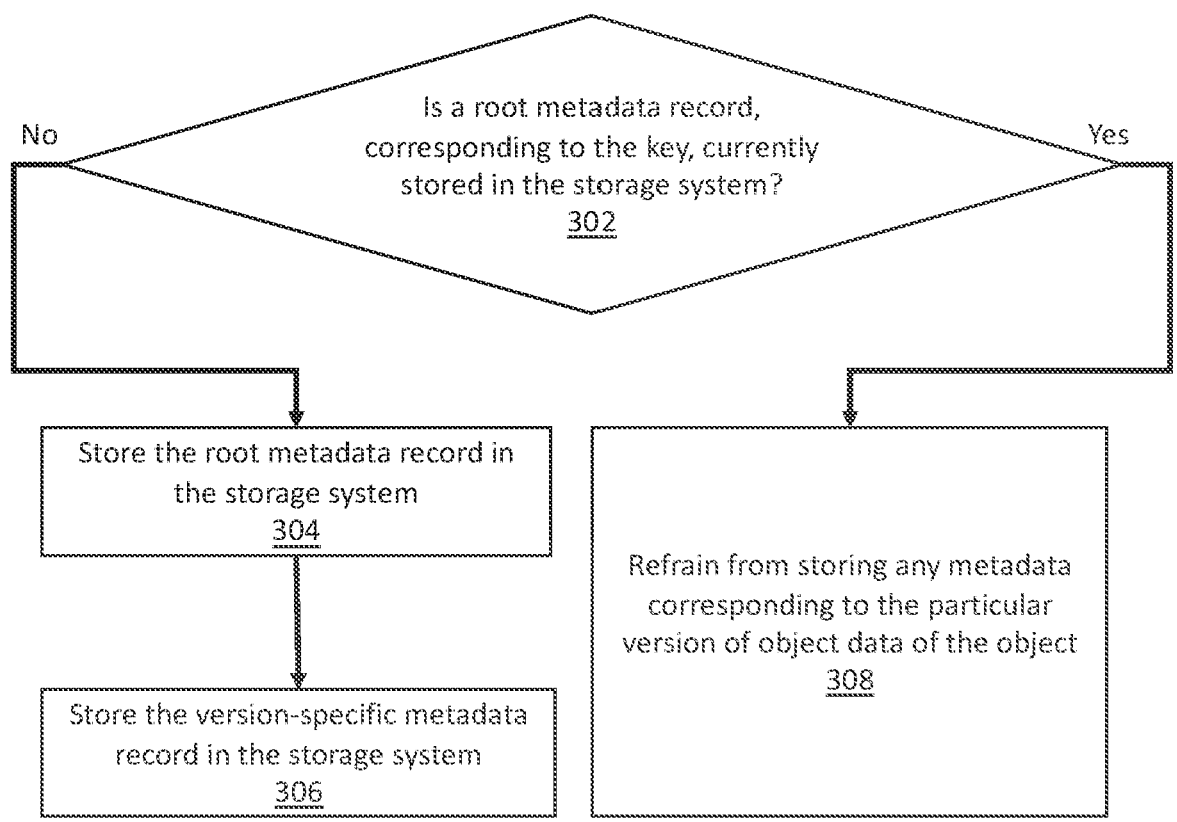
FIG. 3 illustrates an example set of operations for updating a metadata tier of a storage system, in the process of executing a conditional command, in accordance with one or more embodiments.

One or more embodiments include attempting to store the root metadata record and the version-specific metadata record in the storage system (Operation 210). Referring to FIG. 3, FIG. 3 illustrates an example set of operations for attempting to store the root metadata record and the version-specific metadata record.

One or more embodiments include determining whether a root metadata record, corresponding to the key, is currently stored in the storage system (Operation 302). The CCEE 104 searches for an entry corresponding to the key in the metadata tier. If the entry corresponding to the key is found, then the root metadata record is stored in the storage system. If the entry corresponding to the key is not found, then the root metadata record is not stored in the storage system.

If the root metadata record, corresponding to the key, is not currently stored in the storage system, then the CCEE 104 stores the root metadata record, generated at Operation 206, in the storage system (Operation 304). The CCEE 104 stores the root metadata record in the metadata tier of the storage system.

Additionally, the CCEE 104 stores the version-specific metadata record, generated at Operation 208, in the storage system (Operation 306). The CCEE 104 stores the version-specific metadata record in the metadata tier of the storage system.

In an embodiment, the version-specific metadata record is embedded in the root metadata record. The CCEE 104 stores the root metadata record, including the embedded version-specific metadata record, in an entry within the metadata tier. The entry within the metadata tier may be, for example, a row of a table of the metadata tier.

In other embodiments, the CCEE 104 may store the root metadata record and the version-specific metadata record in separate entries within the metadata tier. Since the root metadata record and the version-specific metadata record correspond to a same object, the CCEE 104 stores the root metadata record and the version-specific metadata record in separate entries of a same shard within the metadata tier.

However, if the root metadata record, corresponding to the key, is currently stored in the storage system, then the CCEE 104 refrains from storing any metadata corresponding to the particular version of object data of the object (Operation 308).

In an embodiment, the storage system supports atomic transactions over only a single row, or a single shard. Since the root metadata record and the version-specific metadata record are stored in a same row or a same shard, Operations 302-306 are performed in a single atomic transaction. The atomic transaction may be a read-modify-write transaction that simultaneously: (a) reads from a memory location corresponding to the key determined at Operation 204, and (b) depending on whether read was successful, stores a value into the same memory location.

Since Operations 302-306 are performed in a single atomic transaction, any concurrent commands on the root metadata record cannot interfere with the execution of Operations 302-306. As an example, a CCEE may concurrently receive two requests (referred to herein as Request A and Request B) to store two different versions of object data of a same object, if the object is not currently stored in the storage system. It would not be possible for the CCEE to determine that the condition (the object not being stored in the storage system) is satisfied for both Request A and Request B. Once the CCEE determines that the condition is satisfied for Request A, the CCEE stores a root metadata record for the object in response to Request A. Request B cannot interfere with the process. Subsequently, when the CCEE tests whether the object is stored in the storage system in response to Request B, the CCEE would find that the root metadata record is already stored. Hence, Request B fails.

In other embodiments, Operations 302-304 may be performed in a single atomic transaction, while Operation 306 may be performed in a separate atomic transaction.

Referring back to FIG. 2, one or more embodiments include determining whether the attempt at Operation 210 was successful (Operation 212). If the root metadata record and/or the version-specific metadata record were successfully stored in the storage system, then the attempt was successful. If the root metadata record and/or the version-specific metadata record were not successfully stored in the storage system, then the attempt was not successful.

If the attempt at Operation 210 was successful, then the CCEE 104 stores the particular version of object data of the object, specified in the request received at Operation 202, in the storage system (Operation 214). The CCEE 104 stores the particular version of object data in an entry of the data tier.

However, if the attempt at Operation 210 was not successful, then the CCEE 104 refrains from storing the particular version of object data of the object in the storage system (Operation 216). The CCEE 104 does not fulfill the request to store the particular version of object data of the object.

Figure 4:
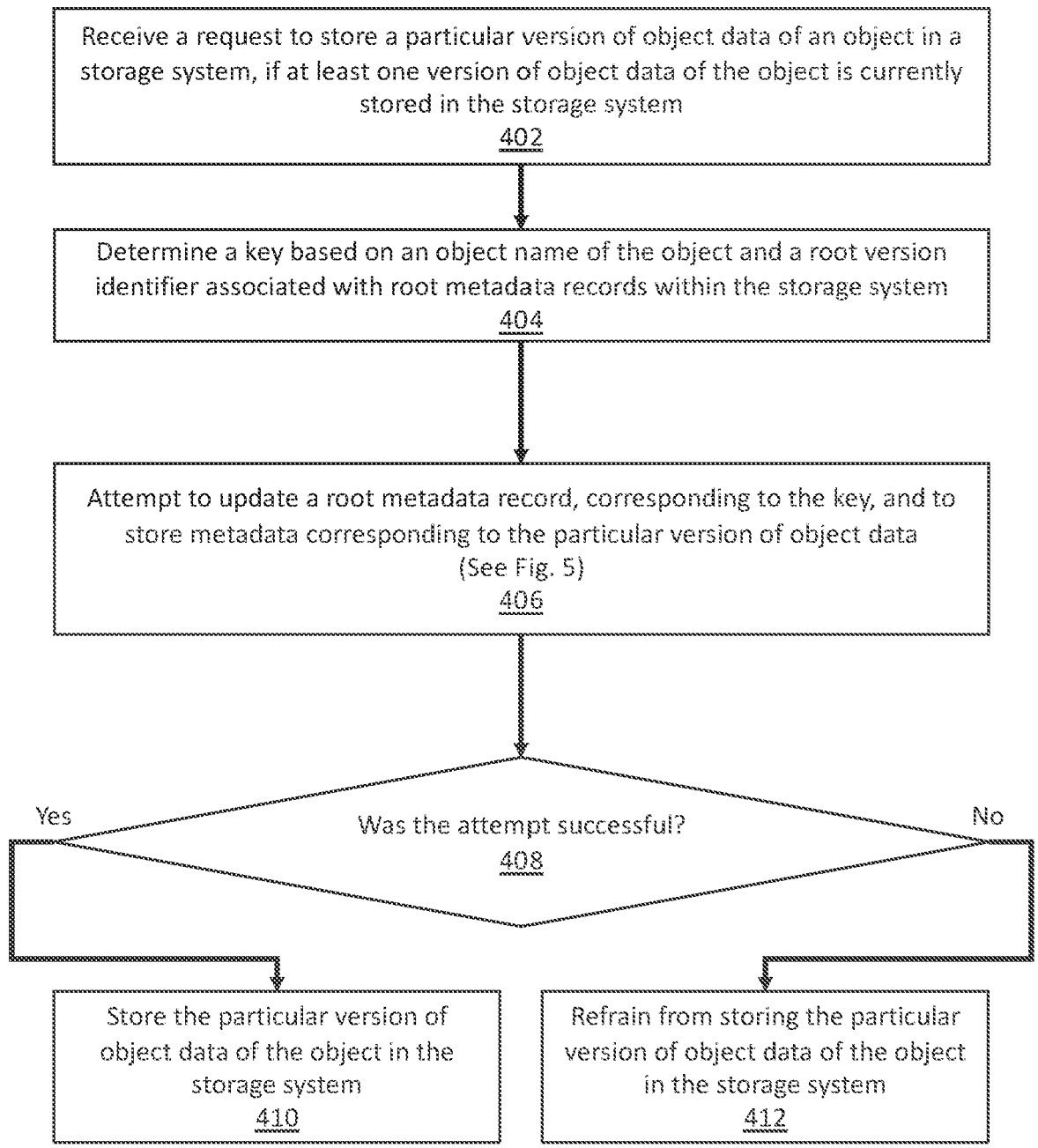
FIG. 4 illustrates an example set of operations for executing a conditional command to store a particular version of object data of an object in a storage system, if the object is currently stored in the storage system, in accordance with one or more embodiments.

B. Storing a Particular Version of Object Data of an Object, if the Object is Currently Stored in the Storage System FIG. 4 illustrates an example set of operations for executing a conditional command to store a particular version of object data of an object in a storage system, if the object is currently stored in the storage system, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include receiving a request to store a particular version of object data of an object in a storage system, if at least one version of object data of the object is currently stored in the storage system (Operation 402). Descriptions relating to receiving a conditional command are discussed above with reference to Operation 202.

One or more embodiments include determining a key based on an object name of the object and a root version identifier associated with root metadata records within the storage system (Operation 404). Descriptions relating to determining a key are discussed above with reference to Operation 204.

Figure 5:
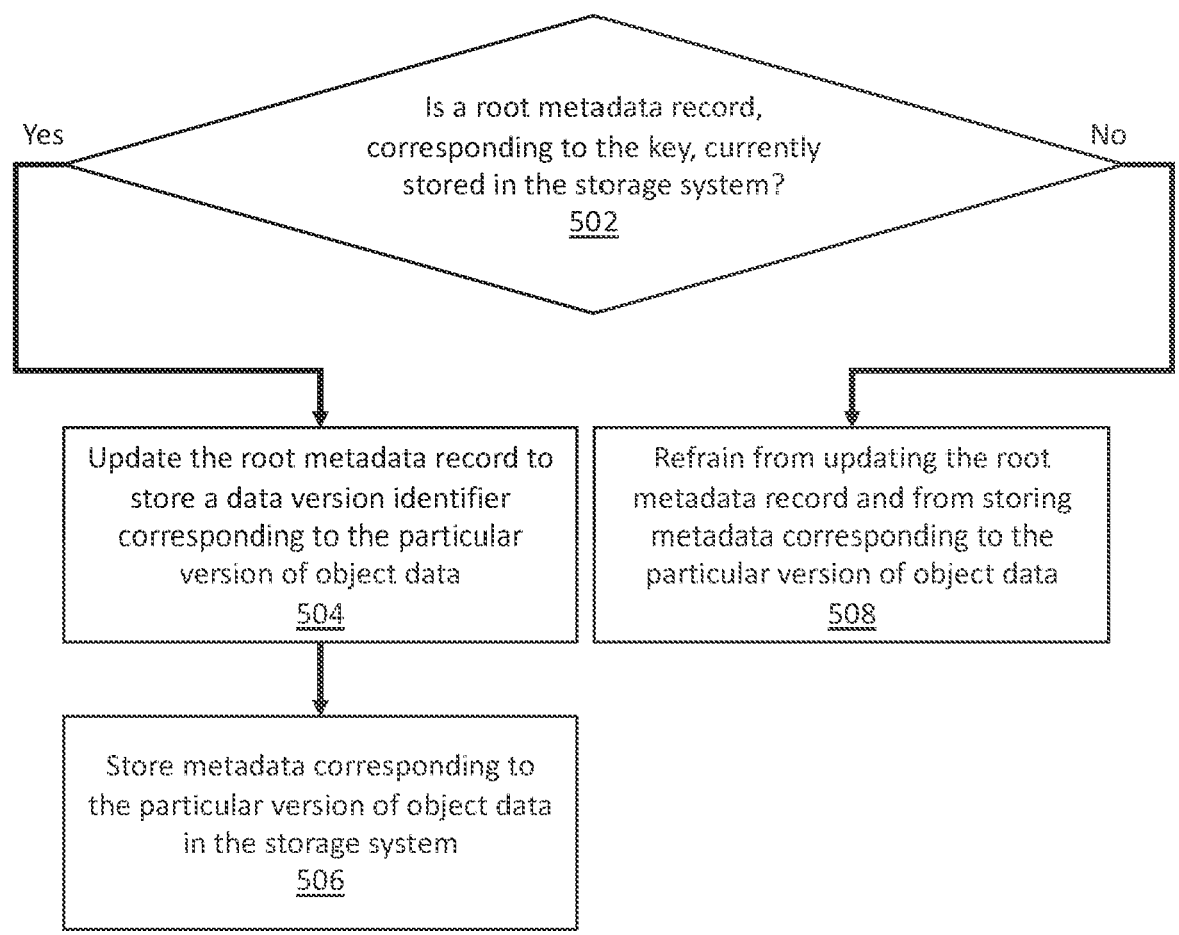
FIG. 5 illustrates an example set of operations for updating a metadata tier of a storage system, in the process of executing a conditional command, in accordance with one or more embodiments.

One or more embodiments include attempting to update a root metadata record, corresponding to the key, and to store a version-specific metadata record corresponding to the particular version of object data (Operation 406). Referring to FIG. 5, FIG. 5 illustrates an example set of operations for attempting to update the metadata tier for storing the particular version of object data.

One or more embodiments include determining whether a root metadata record, corresponding to the key, is currently stored in the storage system (Operation 502). Descriptions relating to determining whether a root metadata record is currently stored are discussed above with reference to Operation 302.

If the root metadata record, corresponding to the key, is currently stored in the storage system, then the CCEE 104 updates the root metadata record to store a data version identifier corresponding to the particular version of object data (Operation 504). As described above with reference to data version identifier list 128 of FIG. 1, the root metadata record maintains a list of data version identifiers of all versions of object data corresponding to the object. A CCEE 104 updates the data version identifier list to include a data version identifier corresponding to the particular version of object data to be stored.

In an embodiment, the CCEE 104 determines the data version identifier corresponding to the particular version of object data based on a time at which the root metadata record is being updated. The data version identifier may include an epoch, a physical time, and/or a logical time associated with when the root metadata record is updated.

In another embodiment, the CCEE 104 determines the data version identifier corresponding to the particular version of object data to be stored by incrementing a data version identifier corresponding to a current version of object data. As an example, a root metadata record may include a data version identifier list that includes "1, 2, 3." The data version identifier list may indicate that there are three version of object data of a same object. The data version identifier list may further indicate that the version identifiers of the three versions of object data are "1," "2," and "3" respectively. The data version identifier of the current version of object data may be "3." A CCEE may increment the data version identifier of the current version of object data. The CCEE may determine that the data version identifier of a particular version of object data to be stored is "4."

Additionally, the CCEE 104 stores metadata corresponding to the particular version of object data in the storage system (Operation 506). The CCEE 104 generates a version-specific metadata record for storing the metadata corresponding to the particular version of object data.

In an embodiment, the version-specific metadata record is embedded in the root metadata record. The CCEE 104 may perform a single update to the root metadata record. The single update to the root metadata record performs both: (a) store a data version identifier corresponding to the particular version of object data in the root metadata record and (b) store the version-specific metadata record in the root metadata record.

In an embodiment, the version-specific metadata record is stored separately from the root metadata record. The root metadata record is stored in one entry of the metadata tier. The CCEE 104 stores the version-specific metadata record in a separate entry of the metadata tier. Since the root metadata record and the version-specific metadata record correspond to a same object, the CCEE 104 stores the version-specific metadata record in a same shard as the root metadata record.

However, if the root metadata record, corresponding to the key, is not currently stored in the storage system, then the CCEE 104 refrains from updating the root metadata record and from storing metadata corresponding to the particular version of object data (Operation 508).

In an embodiment, the storage system supports atomic transactions over only a single row, or a single shard. Since the root metadata record and the version-specific metadata record are stored in a same row or a same shard, Operations 502-506 are performed in a single atomic transaction. The atomic transaction may be a read-modify-write transaction that simultaneously: (a) reads from a memory location corresponding to the key determined at Operation 404, and (b) depending on whether read was successful, stores a value into the same memory location. In other embodiments, Operations 502-504 may be performed in a single atomic transaction, while Operation 506 may be performed in a separate atomic transaction.

Referring back to FIG. 4, one or more embodiments include determining whether the attempt at Operation 406 was successful (Operation 408). If the root metadata record was successfully updated and/or the version-specific metadata record was successfully stored, then the attempt was successful.

If the attempt at Operation 406 was successful, then the CCEE 104 stores the particular version of object data of the object, specified in the request received at Operation 402, in the storage system (Operation 410). The CCEE 104 stores the particular version of object data in an entry of the data tier.

However, if the attempt at Operation 406 was not successful, then the CCEE 104 refrains from storing the particular version of object data of the object in the storage system (Operation 412). The CCEE 104 does not fulfill the request to store the particular version of object data of the object.

Figure 6A:
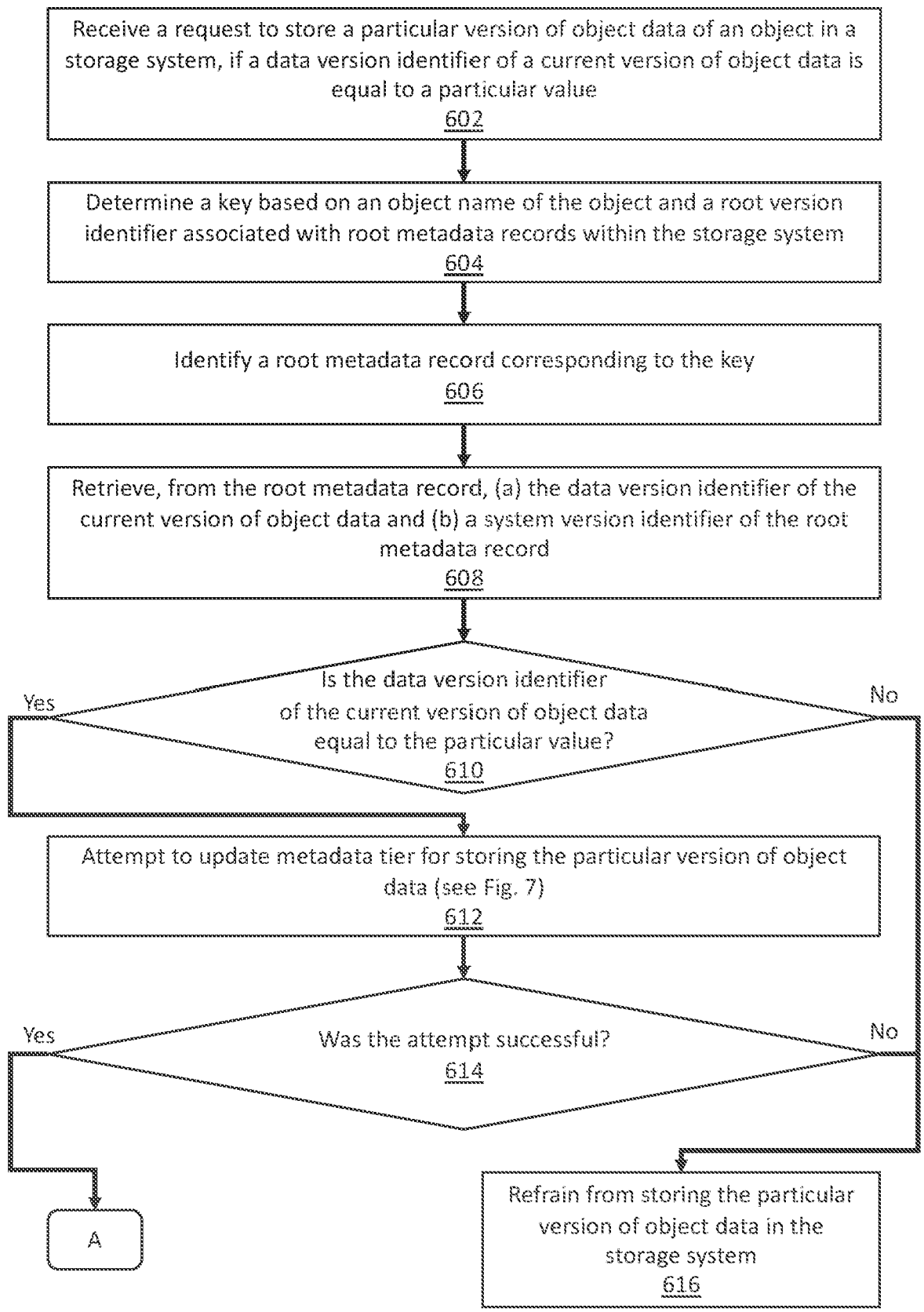
FIGS. 6A-B illustrate an example set of operations for executing a conditional command to store a particular version of object data of an object in a storage system, if the data version identifier of a current version of object data is equal to a particular value, in accordance with one or more embodiments.
Figure 6B:
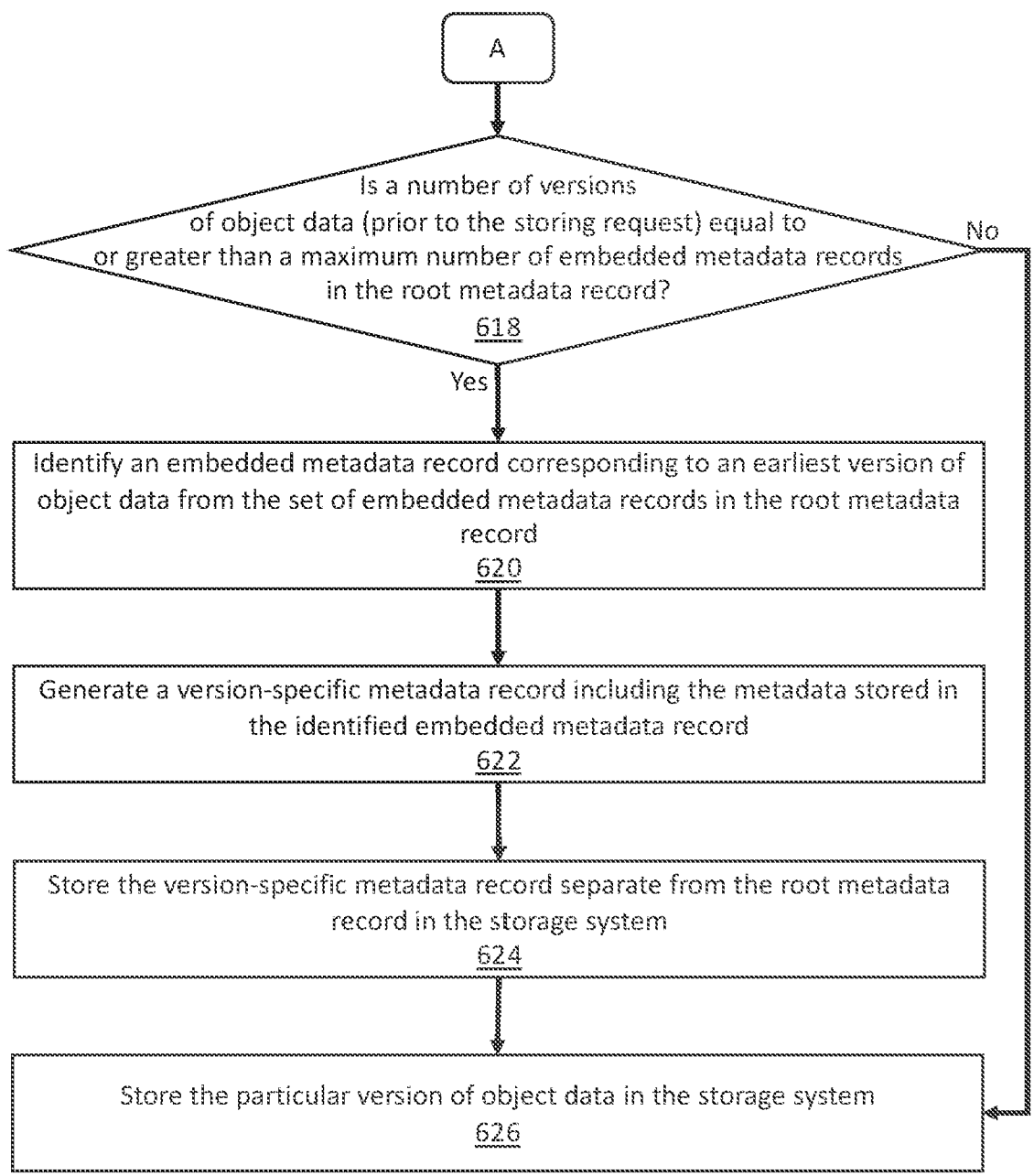

C. Storing a Particular Version of Object Data of an Object, if the Data Version Identifier of a Current Version of Object Data is Equal to a Particular Value FIGS. 6A-B illustrate an example set of operations for executing a conditional command to store a particular version of object data of an object in a storage system, if the data version identifier of a current version of object data is equal to a particular value, in accordance with one or more embodiments. One or more operations illustrated in FIGS. 6A-B may be modified, rearranged, or omitted all together. Accordingly, the particular sequence of operations illustrated in FIGS. 6A-B should not be construed as limiting the scope of one or more embodiments.

One or more embodiments include receiving a request to store a particular version of object data of an object in a storage system, if a data version identifier of a current version of object data is equal to a particular value specified by the request (Operation 602). Descriptions relating to receiving a conditional command are discussed above with reference to Operation 202.

One or more embodiments include determining a key based on an object name of the object and a root version identifier associated with root metadata records within the storage system (Operation 604). Descriptions relating to determining a key are discussed above with reference to Operation 204.

One or more embodiments include identifying a root metadata record corresponding to the key (Operation 606). A CCEE 104 identifies the root metadata record from the metadata tier using the key. If the CCEE 104 is not able find the root metadata record in the storage system, then the CCEE 104 refrains from storing the particular version of object data in the storage system.

One or more embodiments include retrieving, from the root metadata record, (a) the data version identifier of the current version of object data and (b) a system version identifier of the root metadata record (Operation 608). As described above with reference to data version identifier list 128 of FIG. 1, the root metadata record maintains a list of data version identifiers of all versions of object data corresponding to the object. The data version identifier list includes the data version identifier of the current version of object data. Further as described above with reference to system version identifier 126a, the root metadata record is associated with a system version identifier that is modified each time the root metadata record is modified. The system version identifier may be modified by the storage system. The CCEE 104 retrieves, from the root metadata record, (a) the data version identifier of the current version of object data and (b) the system version identifier of the root metadata record. The CCEE 104 may perform a single retrieval from the root metadata record that obtains at least these two pieces of information.

One or more embodiments include determining whether the data version identifier of the current version of object data is equal to the particular value specified in the request received at Operation 602 (Operation 610). The CCEE 104 compares the data version identifier of the current version of object data retrieved at Operation 608 with the particular value specified in the request received at Operation 602.

If the data version identifier of the current version of object data is not equal to the particular value specified in the request received at Operation 602, then the CCEE 104 refrains from storing the particular version of object data in the storage system (Operation 616). The CCEE 104 does not fulfill the request to store the particular version of object data of the object.

Figure 7:
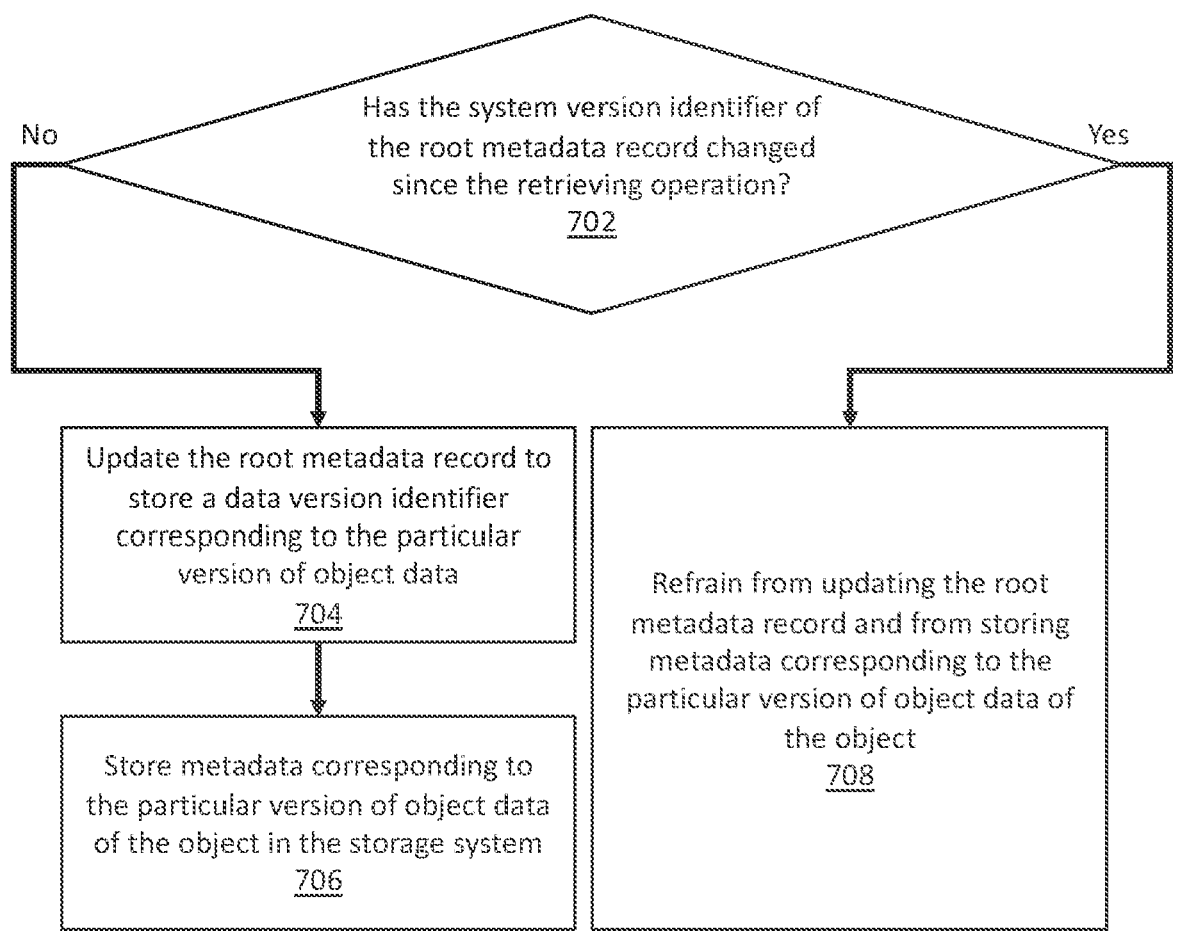
FIG. 7 illustrates an example set of operations for updating a metadata tier of a storage system, in the process of executing a conditional command, in accordance with one or more embodiments.

One or more embodiments include attempting to update the metadata tier for storing the particular version of object data (Operation 612). Referring to FIG. 7, FIG. 7 illustrates an example set of operations for attempting to update the metadata tier.

One or more embodiments include determining whether the system version identifier of the root metadata record has changed since having been retrieved at Operation 608 (Operation 702). The CCEE 104 compares a current system version identifier with the system version identifier previously retrieved at Operation 608.

If the system version identifier of the root metadata record has not changed since having been retrieved at Operation 608, then the CCEE 104 updates the root metadata record to store a data version identifier corresponding to the particular version of object data specified in the request received at Operation 602 (Operation 704). Descriptions relating to updating the root metadata record to store a data version identifier corresponding to the particular version of object data are discussed above with reference to Operation 504.

Additionally, the CCEE 104 stores metadata corresponding to the particular version of object data of the object in the storage system (Operation 706). Descriptions relating to storing metadata corresponding to the particular version of object data are discussed above with reference to Operation 506.

However, if the system version identifier of the root metadata record has changed since having been retrieved at Operation 608, then the CCEE 104 refrains from updating the root metadata record and from storing metadata corresponding to the particular version of object data of the object (Operation 708).

In an embodiment, the storage system supports atomic transactions over only a single row, or a single shard. Since the root metadata record and the version-specific metadata record are stored in a same row or a same shard, Operations 702-706 are performed in a single atomic transaction. The atomic transaction may be a read-modify-write transaction that simultaneously: (a) reads from the root metadata record, and (b) depending on whether the value read from the root metadata record satisfies a condition, stores a new value into the root metadata record.

Since Operations 702-706 are performed in a single atomic transaction, any concurrent commands on the root metadata record cannot interfere with the execution of Operations 702-706. As an example, a CCEE may concurrently receive two requests (referred to herein as Request A and Request B) to store two different versions of object data of a same object, if a data version identifier of a current version of object data is "5." The CCEE may determine that the condition (the data version identifier of a current version of object data is "5") is satisfied for both Request A and Request B. Then, in response to Request A, the CCEE may update the root metadata record to store a data version identifier corresponding to a particular version of object data specified in Request A. The data version identifier corresponding to the particular version of object data specified in Request A may be "6." At the same time, the system version identifier of the root metadata record is modified. Request B cannot interfere with the process. Subsequently, in response to Request B, the CCEE attempts to store a particular version of object data specified in Request B. The CCEE checks whether the system version identifier of the root metadata record has changed since determining that the condition is satisfied for Request B. Since the system version identifier was modified at the time the root metadata record was updated to store the data version identifier of "6," the attempt to store the particular version of object data specified in Request B fails. Hence, Request B fails.

In other embodiments, Operations 702-704 may be performed in a single atomic transaction, while Operation 706 may be performed in a separate atomic transaction.

Referring back to FIG. 6, one or more embodiments include determining whether the attempt at Operation 612 was successful (Operation 614). If the root metadata record was successfully updated and/or the version-specific metadata record was successfully stored, then the attempt was successful.

If the attempt at Operation 612 was not successful, then the CCEE 104 refrains from storing the particular version of object data in the storage system (Operation 616). The CCEE 104 does not fulfill the request to store the particular version of object data of the object.

One or more embodiments include determining whether a number of versions of object data (prior to the storing request at Operation 602) is equal to or greater than a maximum number of embedded metadata records in the root metadata record (Operation 618). The CCEE 104 retrieves the data version identifier list from the root metadata record. The CCEE 104 determines the number of data version identifiers included in the data version identifier list. The CCEE 104 determines whether the number of data version identifiers, prior to adding the data version identifier corresponding to the particular version of object data at Operation 704, is equal to or greater than the maximum number of embedded metadata records in the root metadata record.

If the number of versions of object data (prior to the storing request at Operation 602) is equal to or greater than a maximum number of embedded metadata records in the root metadata record, then Operations 620-624 are performed. Conversely, if the number of versions of object data is less than a maximum number of embedded metadata records in the root metadata record, then Operations 620-624 are not performed. Operations 620-624 relate to moving an embedded metadata record from the root metadata record and storing the metadata from the embedded metadata record as a version-specific metadata record that is separate from the root metadata record, as further described below.

One or more embodiments include identifying an embedded metadata record corresponding to an earliest version of object data from the set of embedded metadata records in the root metadata record (Operation 620). The CCEE 104 identifies a set of version-specific metadata records embedded in the root metadata record. The CCEE 104 identifies one of the set of embedded metadata records that corresponds to an earliest version of object data.

One or more embodiments include generating a version-specific metadata record including the metadata stored in the identified embedded metadata record (Operation 622). The CCEE 104 generates the version-specific metadata record in a memory storage (such as, a random-access memory (RAM)) associated with the CCEE 104. The CCEE 104 copies the metadata from the identified embedded metadata record into the newly-generated version-specific metadata record.

One or more embodiments include storing the version-specific metadata record separate from the root metadata record in the storage system (Operation 624). The CCEE 104 stores the version-specific metadata record in an entry in the metadata tier that is different from the entry storing the root metadata record.

One or more embodiments include storing the particular version of object data in the storage system (Operation 626). The CCEE 104 stores the particular version of object data in an entry of the data tier.

Figure 8A:
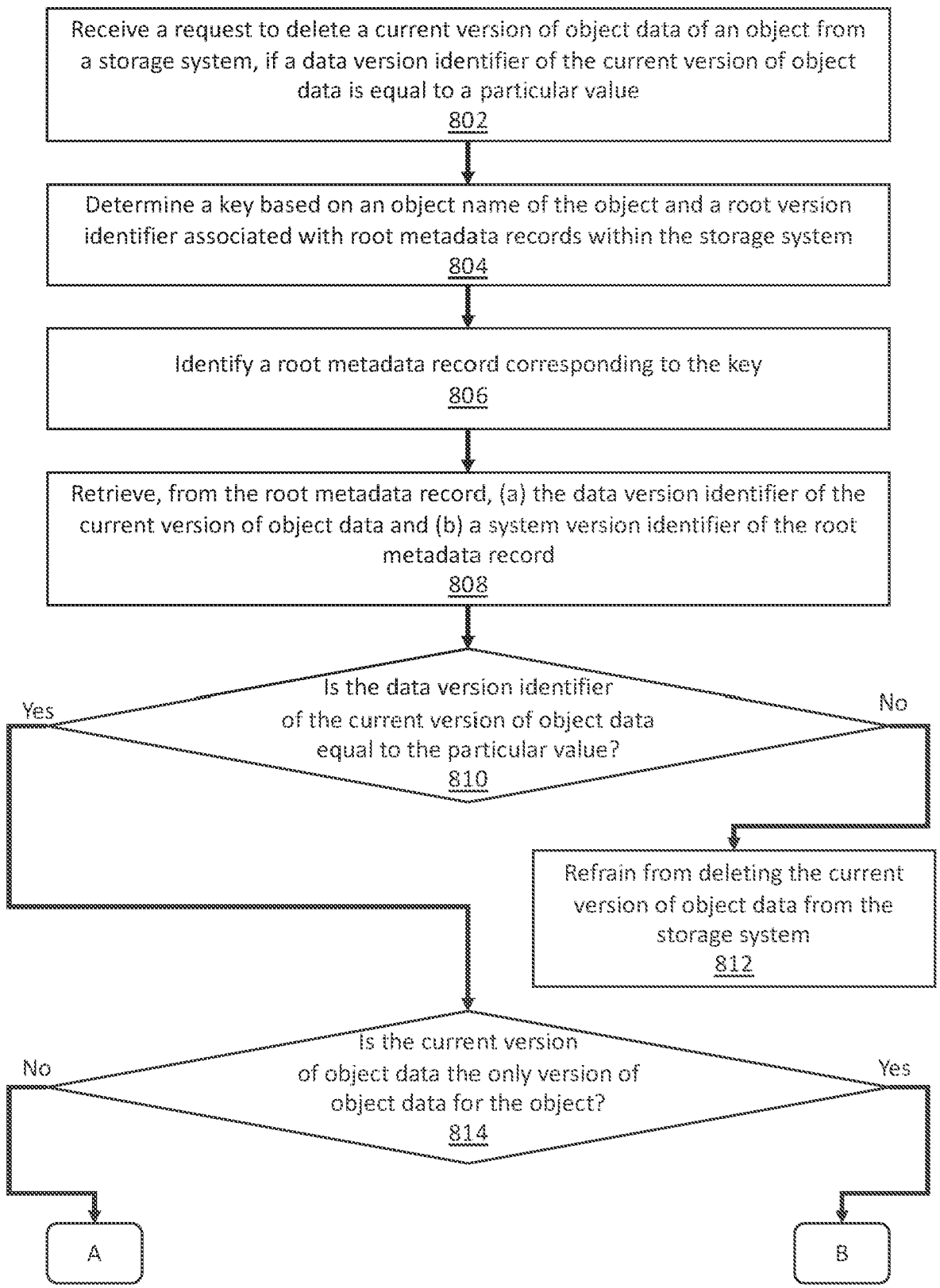
FIGS. 8A-B illustrate an example set of operations for executing a conditional command to delete a current version of object data of an object from a storage system, if the data version identifier of the current version of object data is equal to a particular value, in accordance with one or more embodiments.
Figure 8B:
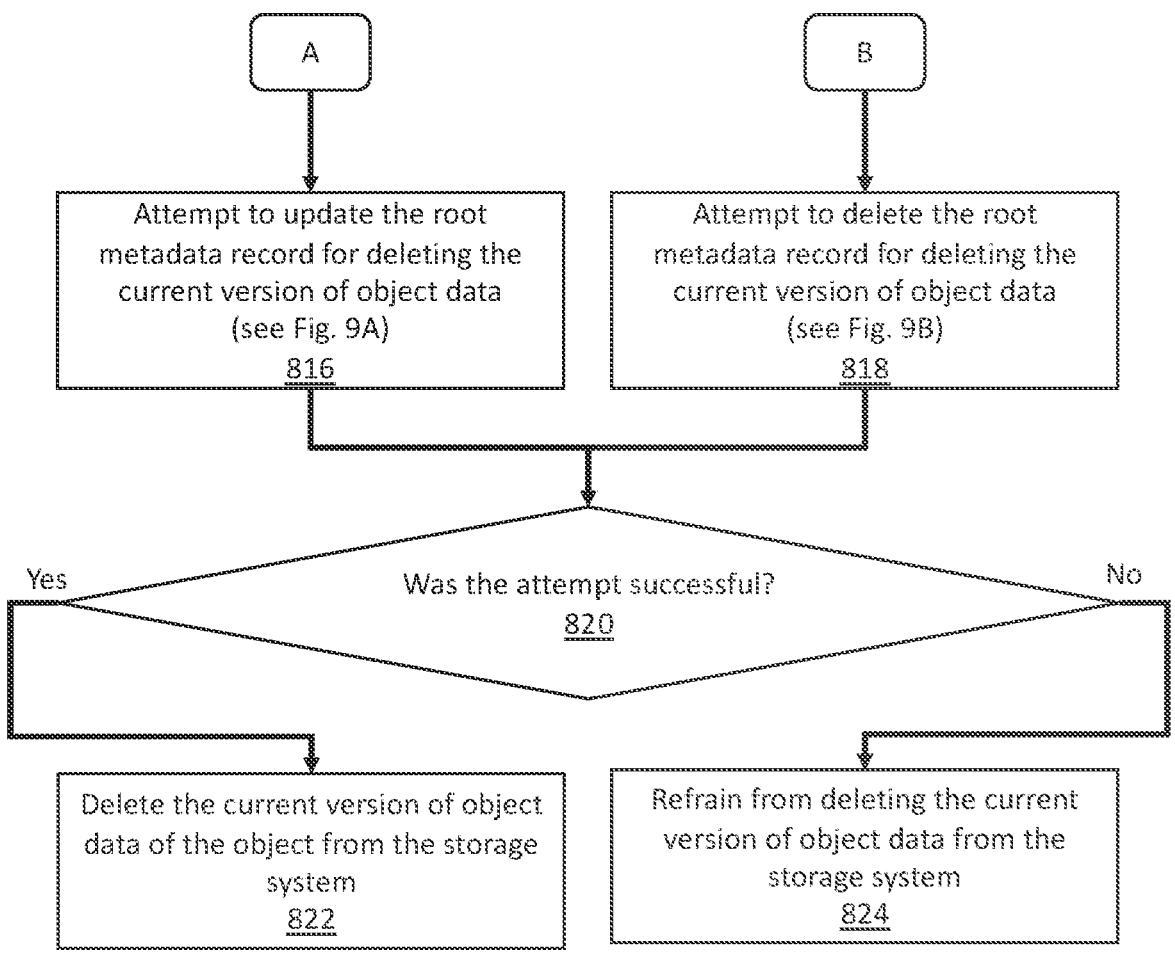

D. Deleting a Current Version of Object Data of an Object, if the Data Version Identifier of the Current Version of Object Data is Equal to a Particular Value FIGS. 8A-B illustrate an example set of operations for executing a conditional command to delete a current version of object data of an object from a storage system, if the data version identifier of the current version of object data is equal to a particular value, in accordance with one or more embodiments. One or more operations illustrated in FIGS. 8A-B may be modified, rearranged, or omitted all together. Accordingly, the particular sequence of operations illustrated in FIGS. 8A-B should not be construed as limiting the scope of one or more embodiments.

One or more embodiments include receiving a request to delete a current version of object data of an object from a storage system, if a data version identifier of the current version of object data is equal to a particular value specified by the request (Operation 802). Descriptions relating to receiving a conditional command are discussed above with reference to Operation 202.

One or more embodiments include determining a key based on an object name of the object and a root version identifier associated with root metadata records within the storage system (Operation 804). Descriptions relating to determining a key are discussed above with reference to Operation 204.

One or more embodiments include identifying a root metadata record corresponding to the key (Operation 806). Descriptions relating to identifying a root metadata record corresponding to the key are discussed above with reference to Operation 606.

One or more embodiments include retrieving, from the root metadata record, (a) the data version identifier of the current version of object data and (b) a system version identifier of the root metadata record (Operation 808). Descriptions relating to retrieving the information from the root metadata record are discussed above with reference to Operation 608.

One or more embodiments include determining whether the data version identifier of the current version of object data is equal to the particular value specified in the request received at Operation 802 (Operation 810). Descriptions relating to determining whether the data version identifier of the current version of object data is equal to the particular value are discussed above with reference to Operation 610.

If the data version identifier of the current version of object data is not equal to the particular value specified in the request received at Operation 602, then the CCEE 104 refrains from deleting the current version of object data from the storage system (Operation 812). The CCEE 104 does not fulfill the request to delete the current version of object data of the object.

One or more embodiments include determining whether the current version of object data is the only version of object data for the object (Operation 814). The CCEE 104 obtains a data version identifier list from the root metadata record identified at Operation 806. The CCEE 104 determines whether the data version identifier list includes more than one data version identifier. If the data version identifier list includes more than one data version identifier, then the current version of object data is not the only version of object data for the object. If the data version identifier list includes only one data version identifier, then the current version of object data is the only version of object data for the object.

Additional and/or alternative methods for determining whether the current version of object data is the only version of object data for the object may be used. As an example, the root metadata record identified at Operation 806 may include a field indicating the number of versions of object data for the object. The CCEE 104 may determine whether the number of versions of object data for the object is more than one. If the number of versions of object data for the object is more than one, then the current version of object data is not the only version of object data for the object. If the number of versions of object data for the object is equal to one, then the current version of object data is the only version of object data for the object.

Figure 9A:
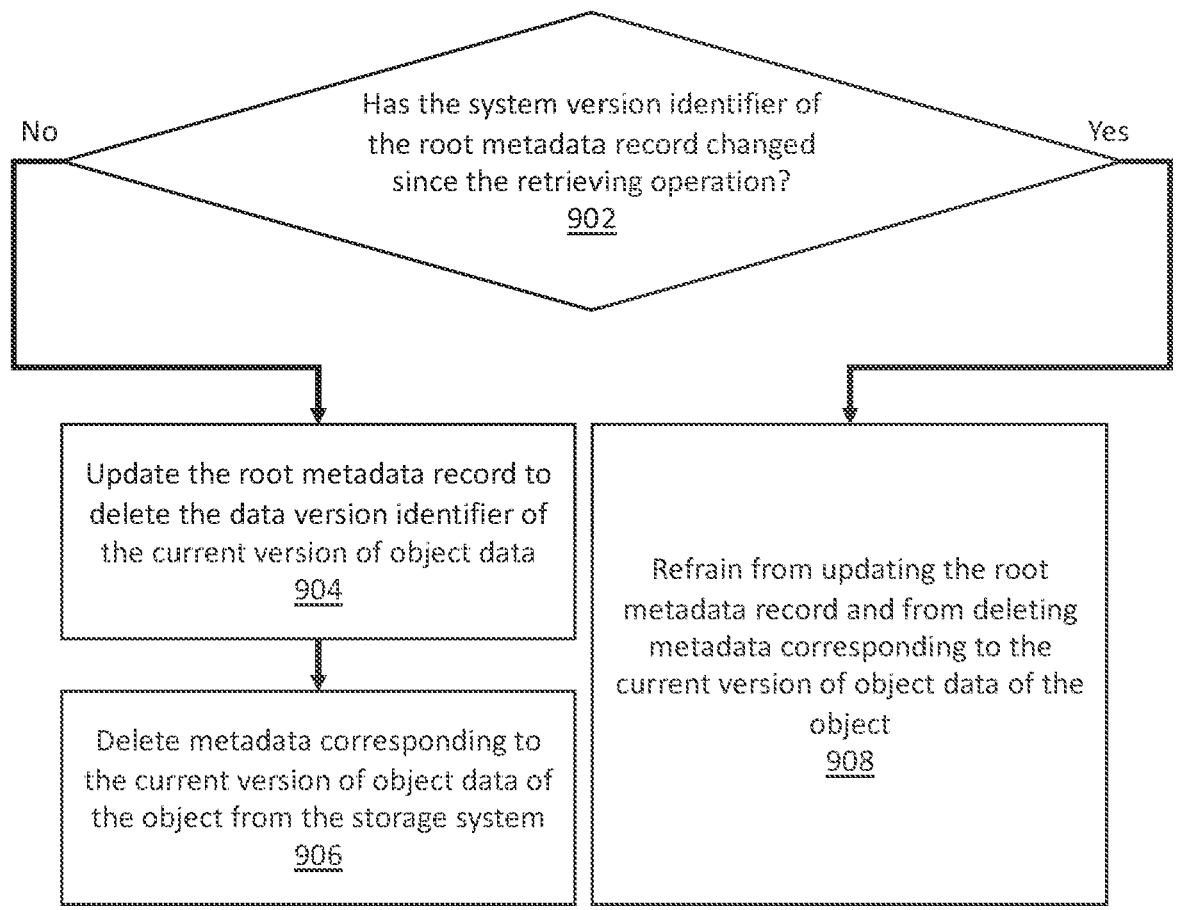
FIGS. 9A-B illustrate example sets of operations for updating a metadata tier of a storage system, in the process of executing a conditional command, in accordance with one or more embodiments.

If the current version of object data is not the only version of object data for the object, then the CCEE 104 attempts to update the root metadata record for deleting the current version of object data (Operation 816). Referring to FIG. 9A, FIG. 9A illustrates an example set of operations for attempting to update the metadata tier.

One or more embodiments include determining whether the system version identifier of the root metadata record has changed since having been retrieved at Operation 808 (Operation 902). Descriptions relating to determining whether the system version identifier has changed are discussed above with reference to Operation 702.

If the system version identifier of the root metadata record has not changed since having been retrieved at Operation 808, then the CCEE 104 updates the root metadata record to remove the data version identifier of the current version of object data (Operation 904). As described above with reference to data version identifier list 128 of FIG. 1, the root metadata record maintains a list of data version identifiers of all versions of object data corresponding to the object. A CCEE 104 updates the data version identifier list to remove a data version identifier corresponding to the current version of object data.

Additionally, the CCEE 104 deletes metadata corresponding to the current version of object data of the object from the storage system (Operation 906). In an embodiment, removing the data version identifier of the current version of object data at Operation 904 removes the ability to access the metadata corresponding to the current version of object data from the metadata tier. The metadata corresponding to the current version of object data is considered deleted from the storage system.

In other embodiments, the CCEE 104 identifies a version-specific metadata record, in the metadata tier, storing the metadata corresponding to the current version of object data. Since the version-specific metadata record corresponds to the current version of object data, the version-specific metadata record may be embedded in the root metadata record. Alternatively, the version-specific metadata record may be stored separately from the root metadata record. The CCEE 104 marks the version-specific metadata record as being deleted. Additionally and/or alternatively, a garbage collection process is performed on the version-specific metadata record to remove the version-specific metadata record from the storage system.

However, if the system version identifier of the root metadata record has changed since having been retrieved at Operation 808, then the CCEE 104 refrains from updating the root metadata record and from deleting metadata corresponding to the current version of object data of the object (Operation 908).

In an embodiment, the storage system supports atomic transactions over only a single row, or a single shard. Since the root metadata record and the metadata corresponding to the current version of object data are stored in a same row or a same shard, Operations 902-906 are performed in a single atomic transaction. The atomic transaction may be a read-modify-write transaction that simultaneously: (a) reads from the root metadata record, and (b) depending on whether the value read from the root metadata record satisfies a condition, stores a new value into the root metadata record. In other embodiments, Operations 902-904 may be performed in a single atomic transaction, while Operation 906 may be performed in a separate atomic transaction.

Figure 9B:
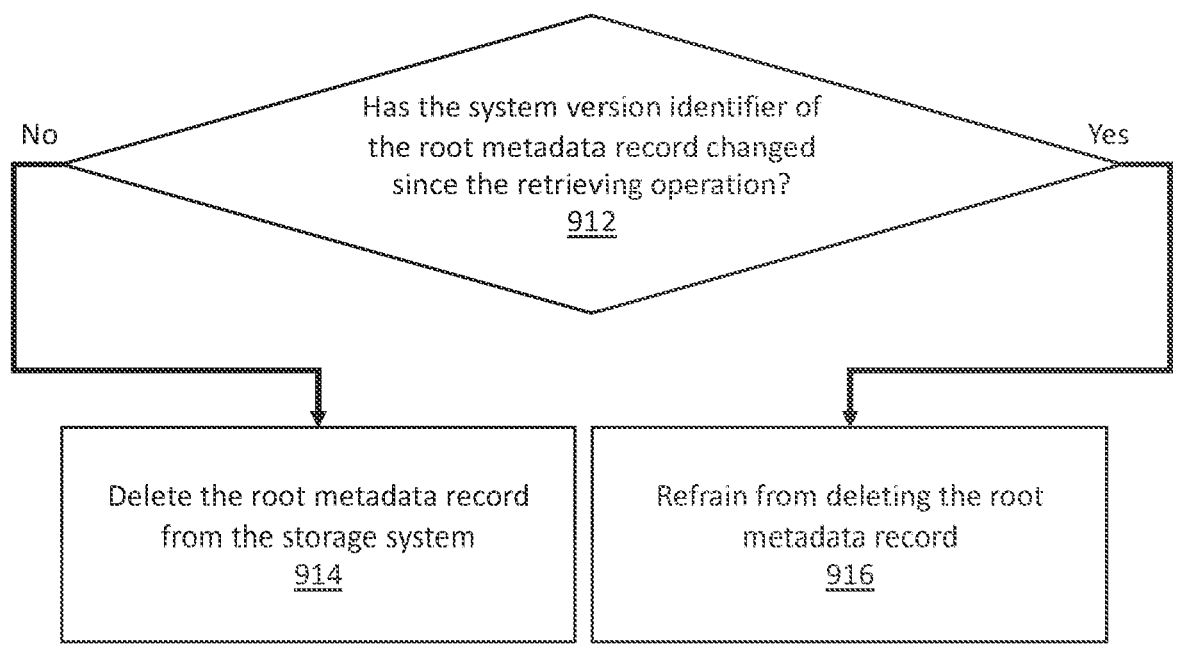

Referring back to FIG. 8, if the current version of object data is the only version of object data for the object, then the CCEE 104 attempts to delete the root metadata record for deleting the current version of object data (Operation 818). Referring to FIG. 9B, FIG. 9B illustrates an example set of operations for attempting to update the metadata tier.

One or more embodiments include determining whether the system version identifier of the root metadata record has changed since having been retrieved at Operation 808 (Operation 912). Descriptions relating to determining whether the system version identifier has changed are discussed above with reference to Operation 702.

If the system version identifier of the root metadata record has not changed since having been retrieved at Operation 808, then the CCEE 104 deletes the root metadata record from the storage system (Operation 914). The CCEE 104 marks the root metadata record as being deleted. Additionally and/or alternatively, a garbage collection process is performed on the root metadata record to remove the root metadata record from the storage system.

However, if the system version identifier of the root metadata record has changed since having been retrieved at Operation 808, then the CCEE 104 refrains from deleting the root metadata record (Operation 916).

In an embodiment, the storage system supports atomic transactions over only a single row, or a single shard. Since the root metadata record and the metadata corresponding to the current version of object data are stored in a same row or a same shard, Operations 912-914 are performed in a single atomic transaction. The atomic transaction may be a read-modify-write transaction that simultaneously: (a) reads from the root metadata record, and (b) depending on whether the value read from the root metadata record satisfies a condition, deletes the root metadata record from the storage system.

Referring back to FIG. 8, one or more embodiments include determining whether the attempt at Operation 816 or Operation 818 was successful (Operation 820). If the metadata tier was successfully updated, then the attempt was successful.

If the attempt at Operation 816 or Operation 818 was not successful, then the CCEE 104 refrains from deleting the current version of object data from the storage system (Operation 824). The CCEE 104 does not fulfill the request to delete the current version of object data.

One or more embodiments include deleting the current version of object data of the object from the storage system (Operation 822). In an embodiment, removing the data version identifier of the current version of object data at Operation 904 removes the ability to access the current version of object data from the data tier. The current version of object data is considered deleted from the storage system. Alternatively, deleting the root metadata record at Operation 914 removes the ability to access the current version of object data from the data tier. The current version of object data is considered deleted from the storage system.

In other embodiments, the CCEE 104 identifies a data record, in the data tier, storing the current version of object data. The CCEE 104 marks the data record as being deleted. Additionally and/or alternatively, a garbage collection process is performed on the data record to remove the data record from the data tier of the storage system.

Figure 10:
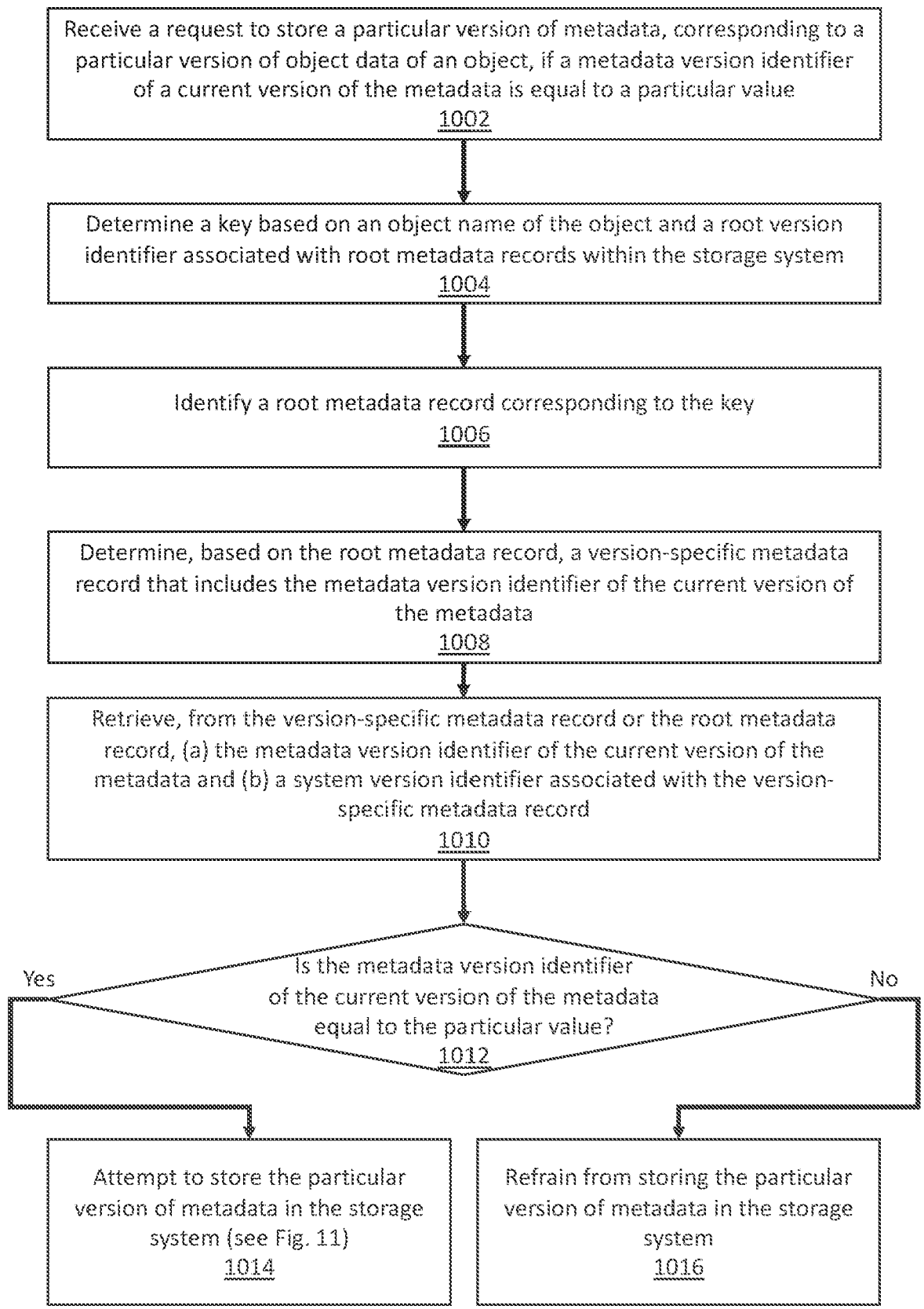
FIG. 10 illustrates an example set of operations for executing a conditional command to store a particular version of metadata in a storage system, if a metadata version identifier of a current version of the metadata is equal to a particular value, in accordance with one or more embodiments.

E. Storing a Particular Version of Metadata, if the Metadata Version Identifier of a Current Version of the Metadata is Equal to a Particular Value FIG. 10 illustrates an example set of operations for executing a conditional command to store a particular version of metadata in a storage system, if a metadata version identifier of a current version of the metadata is equal to a particular value, in accordance with one or more embodiments. One or more operations illustrated in FIG. 10 may be modified, rearranged, or omitted all together. Accordingly, the particular sequence of operations illustrated in FIG. 10 should not be construed as limiting the scope of one or more embodiments.

One or more embodiments include receiving a request to store a particular version of metadata, corresponding to a particular version of object data of an object, if a metadata version identifier of a current version of the metadata is equal to a particular value specified by the request (Operation 1002). Descriptions relating to receiving a conditional command are discussed above with reference to Operation 202. The request includes a data version identifier of the particular version of object data. The request may be conditioned upon the user metadata version identifier of the current version of the metadata being equal to the particular value. Alternatively, the request may be conditioned upon the global metadata version identifier of the current version of the metadata being equal to the particular value.

One or more embodiments include determining a key based on an object name of the object and a root version identifier associated with root metadata records within the storage system (Operation 1004). Descriptions relating to determining a key are discussed above with reference to Operation 204.

One or more embodiments include identifying a root metadata record corresponding to the key (Operation 1006). Descriptions relating to identifying a root metadata record corresponding to the key are discussed above with reference to Operation 606.

One or more embodiments include determining, based on the root metadata record, a version-specific metadata record that includes the metadata version identifier of the current version of the metadata (Operation 1008). The version-specific metadata record that includes the metadata version identifier of the current version of the metadata is the version-specific metadata record corresponding to the particular version of object data specified in the request received at 1002.

A CCEE 104 determines whether the version-specific metadata record is embedded in the root metadata record, or stored separately from the root metadata record. Example methods for making the determination are described below. Additional and/or alternative methods for making the determination may be used.

In an embodiment, the CCEE 104 retrieves the embedded version-specific metadata records from the root metadata record. The CCEE 104 scans through the embedded version-specific metadata records to determine whether any of the embedded version-specific metadata records corresponds to the particular version of object data. The embedded version-specific metadata records corresponding to the particular version of object data is identified. However, if none of the embedded version-specific metadata record corresponds to the particular version of object data, then the version-specific metadata record corresponding to the particular version of object data is stored separately from the root metadata record.

In another embodiment, the CCEE 104 retrieves the data version identifier list from the root metadata record. The CCEE 104 identifies the data version identifier of the particular version of object data, specified in the request received at Operation 1002, from the data version identifier list. The CCEE orders the data version identifiers, in the data version identifier list, based on a chronological order in which the corresponding versions of object data were stored in the storage system. Based on the ordered list of data version identifiers, the CCEE 104 determines the number of data version identifiers subsequent to the data version identifier corresponding to the particular version of object data.

If the number of data version identifiers subsequent to the data version identifier corresponding to the particular version of object data is less than a maximum number of embedded metadata records in the root metadata record, then the version-specific metadata record corresponding to the particular version of object data is embedded in the root metadata record. If the number of data version identifiers subsequent to the data version identifier corresponding to the particular version of object data is equal to or greater than a maximum number of embedded metadata records in the root metadata record, then the version-specific metadata record corresponding to the particular version of object data is stored separately from the root metadata record.

If the version-specific metadata record is embedded in the root metadata record, then the version-specific metadata record is accessed using the key corresponding to the root metadata record. The version-specific metadata record includes the metadata version identifier of the current version of the metadata corresponding to the particular version of object data.

However, if the version-specific metadata record is stored separately from the root metadata record, then the CCEE 104 determines a key associated with the version-specific metadata record based on (a) the object name of the object and (b) the data version identifier corresponding to the particular version of object data. The CCEE 104 accesses the version-specific metadata record, from the metadata tier, using the key. The version-specific metadata record includes the metadata version identifier of the current version of the metadata corresponding to the particular version of object data.

One or more embodiments include retrieving, from the version-specific metadata record or the root metadata record, (a) the metadata version identifier of the current version of the metadata and (b) a system version identifier associated with the version-specific metadata record (Operation 1010). The version-specific metadata record includes at least the metadata version identifier of the current version of the metadata. The version-specific metadata record optionally includes the metadata version identifiers of all versions of the metadata. The metadata version identifier may be a user metadata version identifier and/or a global metadata version identifier.

In an embodiment, the version-specific metadata record is embedded in the root metadata record. As described above with reference to system version identifier 126a of FIG. 1, a version-specific metadata record that is embedded in the root metadata record is associated with the system version identifier of the root metadata record. The CCEE 104 retrieves, from from the root metadata record storing the version-specific metadata record, (a) the metadata version identifier of the current version of the metadata and (b) the system version identifier of the root metadata record. The CCEE 104 may perform a single retrieval from the root metadata record that obtains at least these two pieces of information.

In an embodiment, the version-specific metadata record is stored separately from the root metadata record. As described above with reference to system version identifier 126b of FIG. 1, a version-specific metadata record that is stored separately from the root metadata record is associated with the system version identifier of the version-specific metadata record itself. The CCEE 104 retrieves, from the version-specific metadata record that is stored separately from the root metadata version, (a) the metadata version identifier of the current version of the metadata and (b) the system version identifier of the version-specific metadata record. The CCEE 104 may perform a single retrieval from the version-specific metadata record that obtains at least these two pieces of information.

One or more embodiments include determining whether the metadata version identifier of the current version of the metadata is equal to the particular value specified in the request received at Operation 1002 (Operation 1012). The CCEE 104 compares the metadata version identifier of the current version of the metadata retrieved at Operation 1010 with the particular value specified in the request received at Operation 1002.

If the metadata version identifier of the current version of the metadata is not equal to the particular value specified in the request received at Operation 1002, then the CCEE 104 refrains from storing the particular version of metadata in the storage system (Operation 1016). The CCEE 104 does not fulfill the request to store the particular version of metadata.

Figure 11:
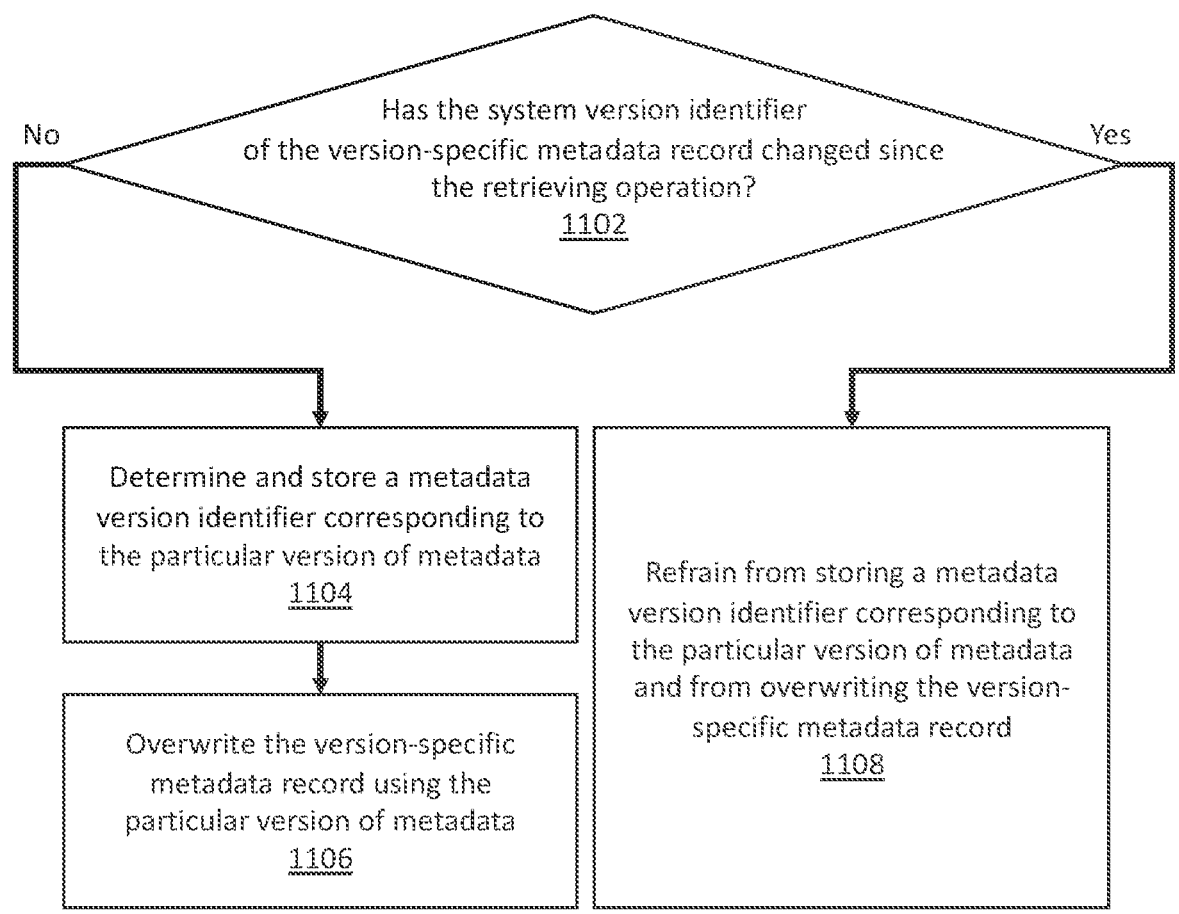
FIG. 11 illustrates an example set of operations for storing a particular version of metadata, in the process of executing a conditional command, in accordance with one or more embodiments.

One or more embodiments include attempting to store the particular version of metadata in the storage system (Operation 1014). Referring to FIG. 11, FIG. 11 illustrates an example set of operations for attempting to store the particular version of metadata.

One or more embodiments include determining whether the system version identifier of the version-specific metadata record has changed since having been retrieved at Operation 1010 (Operation 1102). Descriptions relating to determining whether the system version identifier has changed are discussed above with reference to Operation 702.

If the system version identifier of the version-specific metadata record has not changed since having been retrieved at Operation 1010, then the CCEE 104 determines and stores a metadata version identifier corresponding to the particular version of metadata (Operation 1104).

If the request received at Operation 1002 is initiated by a user, then the CCEE 104 determines a new user metadata version identifier and a new global metadata version identifier corresponding to the particular version of metadata. If the request received at Operation 1002 is initiated by a system, then the CCEE 104 determines a new global metadata version identifier corresponding to the particular version of metadata. The user metadata version identifier is not updated.

In an embodiment, the CCEE 104 determines the user metadata version identifier and/or global metadata version identifier corresponding to the particular version of metadata based on a time at which the version-specific metadata record is being updated. The user metadata version identifier and/or global metadata version identifier may include an epoch, a physical time, and/or a logical time associated with when the version-specific metadata record is updated.

In another embodiment, the CCEE 104 determines the user metadata version identifier and/or global metadata version identifier corresponding to the particular version of metadata to be stored by incrementing a user metadata version identifier and/or global metadata version identifier corresponding to a current version of metadata. As an example, a metadata version identifier of a current version of metadata may be "3." A CCEE may increment the metadata version identifier of the current version of metadata. The CCEE may determine that the metadata version identifier of a particular version of metadata to be stored is "4."

The CCEE 104 stores the determined user metadata version identifier and/or global metadata version identifier in the version-specific metadata record. The CCEE 104 may overwrite the user metadata version identifier and/or global metadata version identifier corresponding to the current version of the metadata using the determined user metadata version identifier and/or global metadata version identifier. Alternatively, the CCEE 104 may store the determined user metadata version identifier and/or global metadata version identifier in addition to the user metadata version identifier and/or global metadata version identifier corresponding to the current version of the metadata.

Additionally, the CCEE 104 overwrites the version-specific metadata record using the particular version of metadata (Operation 1106). The CCEE 104 replaces the metadata initially stored in the version-specific metadata record with the particular version of metadata specified in the request received at Operation 1002.

In other embodiments, the CCEE 104 may store the particular version of metadata, specified in the request received at Operation 1002, in a new version-specific metadata record.

However, if the system version identifier of the version-specific metadata record has changed since having been retrieved at Operation 1010, then the CCEE 104 refrains from storing a metadata version identifier corresponding to the particular version of metadata and from overwriting the version-specific metadata record (Operation 1108). The CCEE 104 does not fulfill the request to store the particular version of metadata.

In an embodiment, the storage system supports atomic transactions over only a single row, or a single shard. Since Operations 1102-1106 are performed on a particular entry storing the version-specific metadata record, Operations 1102-1106 are performed in a single atomic transaction. The atomic transaction may be a read-modify-write transaction that simultaneously: (a) reads from an entry storing the version-specific metadata record or the root metadata record, and (b) depending on whether the value read from the entry satisfies a condition, stores a new value into the entry. In other embodiments, Operations 1102-1104 may be performed in a single atomic transaction, while Operation 1106 may be performed in a separate atomic transaction.

Figure 12A:
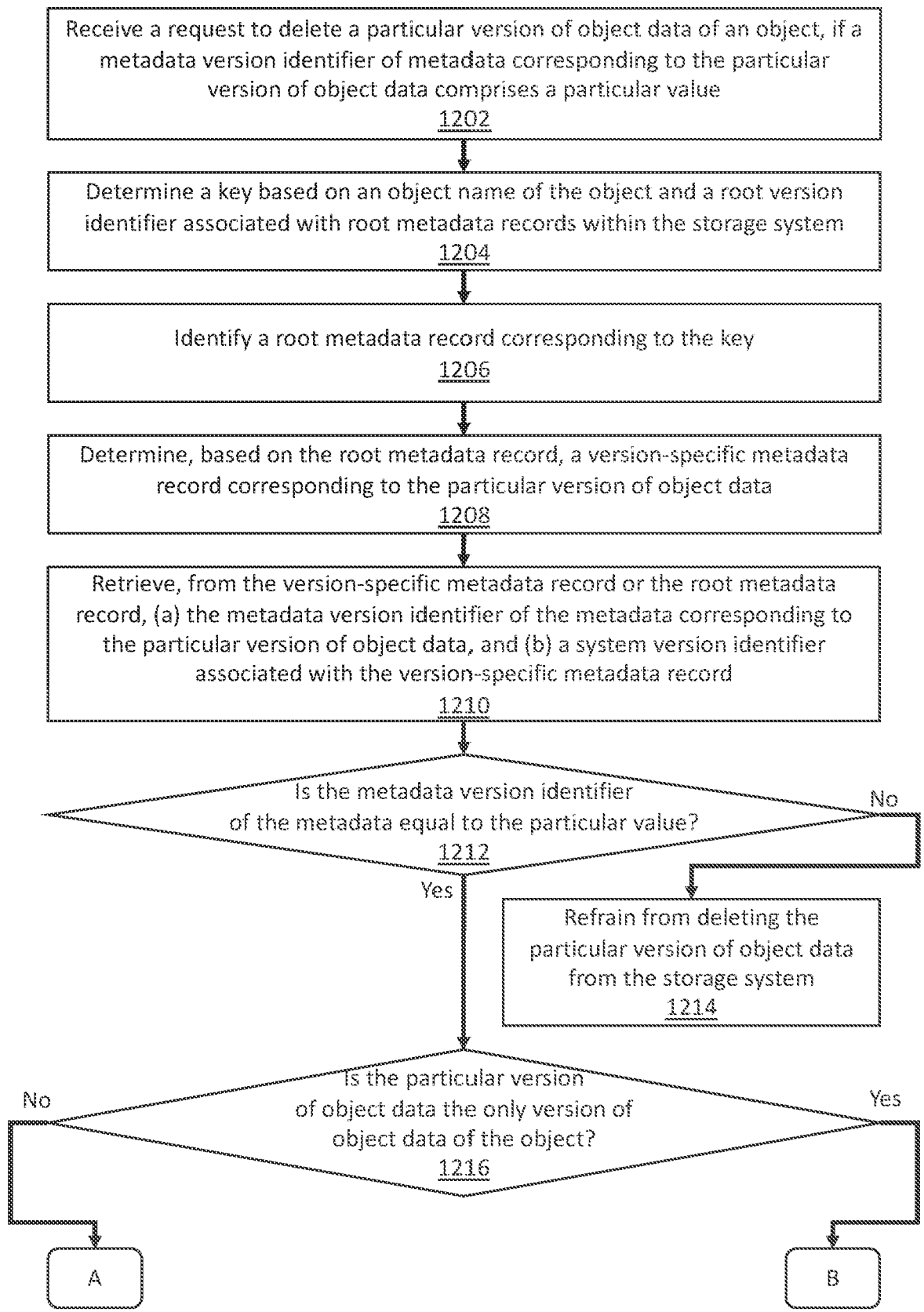
FIGS. 12A-B illustrate an example set of operations for executing a conditional command to delete a particular version of object data of an object from a storage system, if a metadata version identifier of metadata corresponding to the particular version of object data is equal to a particular value, in accordance with one or more embodiments.
Figure 12B:
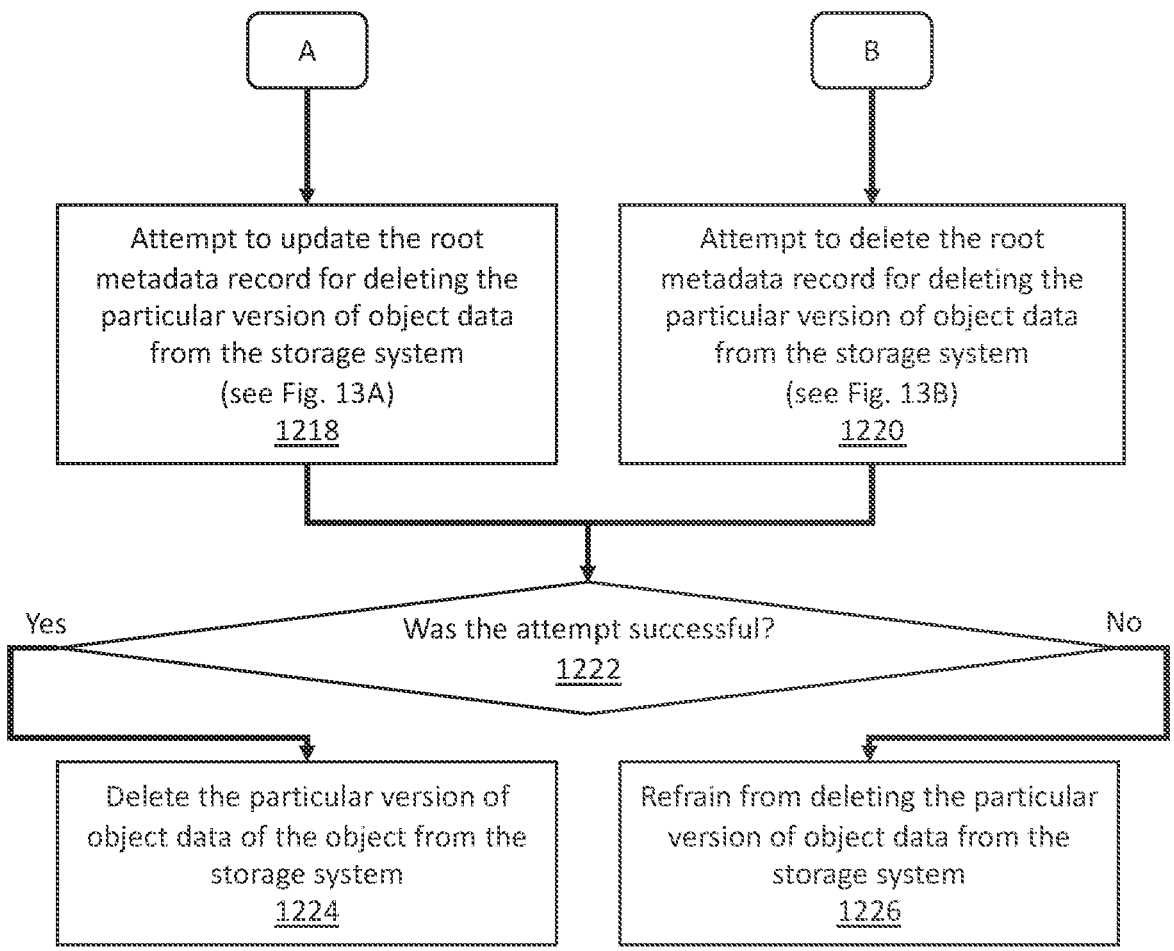

F. Deleting a Particular Version of Object Data of an Object, if a Metadata Version Identifier of Metadata Corresponding to the Particular Version of Object Data is Equal to a Particular Value FIGS. 12A-B illustrate an example set of operations for executing a conditional command to delete a particular version of object data of an object from a storage system, if a metadata version identifier of metadata corresponding to the particular version of object data is equal to a particular value, in accordance with one or more embodiments. One or more operations illustrated in FIGS. 12A-B may be modified, rearranged, or omitted all together. Accordingly, the particular sequence of operations illustrated in FIGS. 12A-B should not be construed as limiting the scope of one or more embodiments.

One or more embodiments include receiving a request to delete a particular version of object data of an object, if a metadata version identifier of metadata corresponding to the particular version of object data is equal to a particular value specified by the request (Operation 1202). Descriptions relating to receiving a conditional command are discussed above with reference to Operation 202. The request includes a data version identifier of the particular version of object data. The request may be conditioned upon the user metadata version identifier of the current version of the metadata being equal to the particular value. Alternatively, the request may be conditioned upon the global metadata version identifier of the current version of the metadata being equal to the particular value.

One or more embodiments include determining a key based on an object name of the object and a root version identifier associated with root metadata records within the storage system (Operation 1204). Descriptions relating to determining a key are discussed above with reference to Operation 204.

One or more embodiments include identifying a root metadata record corresponding to the key (Operation 1206). Descriptions relating to identifying a root metadata record corresponding to the key are discussed above with reference to Operation 606.

One or more embodiments include determining, based on the root metadata record, a version-specific metadata record corresponding to the particular version of object data specified in the request received at Operation 1202 (Operation 1208). Descriptions relating to determining the version-specific metadata record corresponding to the particular version of object data are discussed above with reference to Operation 1008.

One or more embodiments include retrieving, from the version-specific metadata record or the root metadata record, (a) the metadata version identifier of the metadata corresponding to the particular version of object data and (b) a system version identifier associated with the version-specific metadata record (Operation 1210). Descriptions relating to retrieving the information from the version-specific metadata record or the root metadata record are discussed above with reference to Operation 1010.

One or more embodiments include determining whether the metadata version identifier of the metadata is equal to the particular value specified in the request received at Operation 1202 (Operation 1212). Descriptions relating to determining whether the metadata version identifier of the metadata is equal to the particular value are discussed above with reference to Operation 1012.

If the metadata version identifier of the metadata is not equal to the particular value specified in the request received at Operation 1202, then the CCEE 104 refrains from deleting the particular version of object data from the storage system (Operation 1214). The CCEE 104 does not fulfill the request to delete the particular version of object data.

One or more embodiments include determining whether the particular version of object data is the only version of object data of the object (Operation 1216). Descriptions relating to determining whether only one version of object data is stored for an object are discussed above with reference to Operation 814.

Figure 13A:
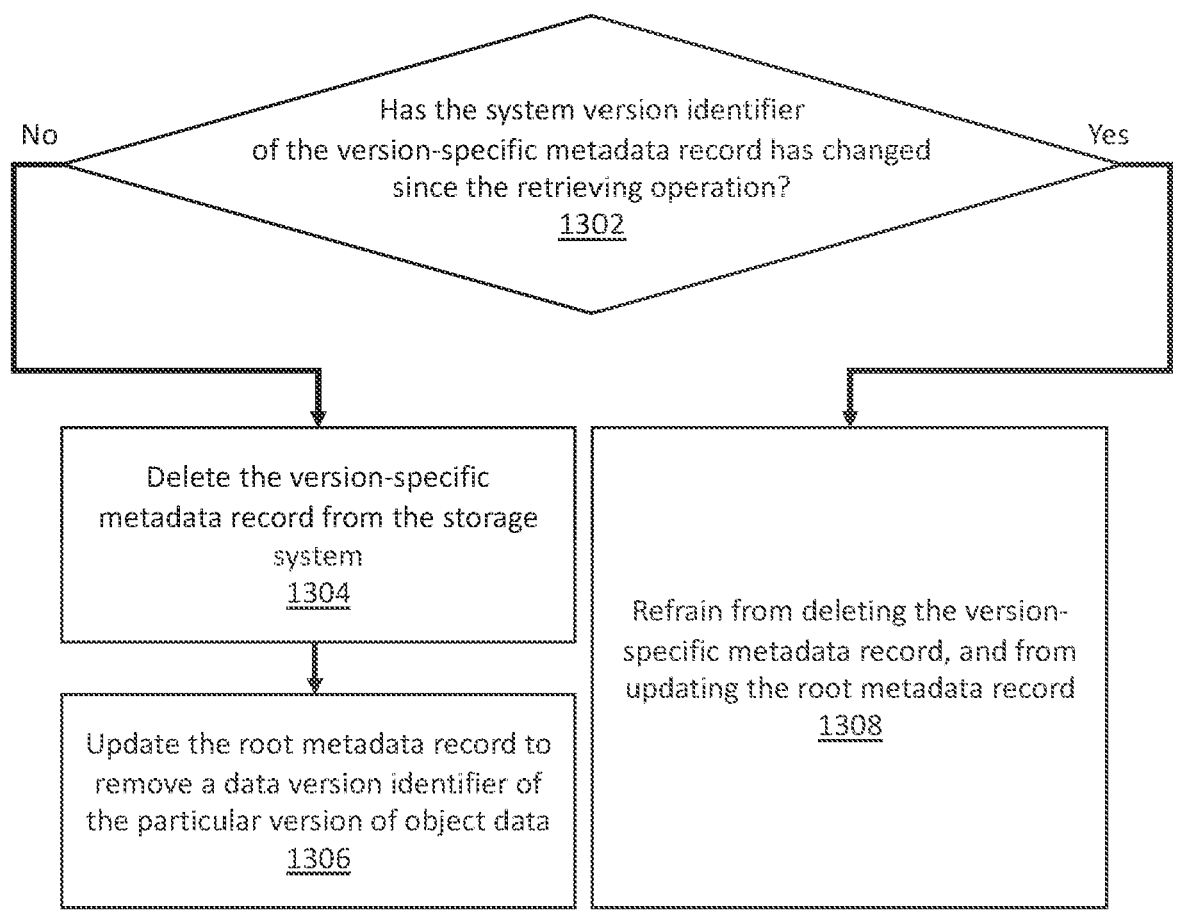
FIGS. 13A-B illustrate example sets of operations for updating a metadata tier of a storage system, in the process of executing a conditional command, in accordance with one or more embodiments.

If the particular version of object data is not the only version of object data of the object, then the CCEE attempts to update the root metadata record for deleting the particular version of object data from the storage system (Operation 1218). Referring to FIG. 13A, FIG. 13A illustrates an example set of operations for attempting to update the metadata tier.

One or more embodiments include determining whether the system version identifier of the version-specific metadata record has changed since having been retrieved at Operation 1210 (Operation 1302). Descriptions relating to determining whether the system version identifier has changed are discussed above with reference to Operation 702.

If the system version identifier of the version-specific metadata record has not changed since having been retrieved at Operation 1210, then the CCEE 104 deletes the version-specific metadata record from the storage system (Operation 1304). In an embodiment, removing the data version identifier of the particular version of object data, described below with reference to Operation 1306, removes the ability to access the version-specific metadata record corresponding to the particular version of object data from the metadata tier. The version-specific metadata record is considered deleted from the storage system.

In other embodiments, the CCEE 104 marks the version-specific metadata record as being deleted. The version-specific metadata record may be embedded in the root metadata record, or stored separately from the root metadata record, as determined at Operation 1208. Additionally and/or alternatively, a garbage collection process is performed on the version-specific metadata record to remove the version-specific metadata record from the storage system.

Additionally, the CCEE 104 updates the root metadata record to remove a data version identifier of the particular version of object data (Operation 1306). Descriptions relating to updating the root metadata record to remove a data version identifier are discussed above with reference to Operation 904.

However, if the system version identifier of the version-specific metadata record has changed since having been retrieved at Operation 1210, then the CCEE 104 refrains from deleting the version-specific metadata record, and from updating the root metadata record (Operation 1308).

In an embodiment, the storage system supports atomic transactions over only a single row, or a single shard. Since the root metadata record and the version-specific metadata record are stored in a same row or a same shard, Operations 1302-1306 are performed in a single atomic transaction. The atomic transaction may be a read-modify-write transaction that simultaneously: (a) reads from the version-specific metadata record or the root metadata record, and (b) depending on whether the value read from the version-specific metadata record or the root metadata record satisfies a condition, deletes the version-specific metadata record and/or stores a new value into the root metadata record. In other embodiments, Operations 1302-1304 may be performed in a single atomic transaction, while Operation 1306 and/or Operation 1308 may be performed in separate atomic transaction(s).

Figure 13B:
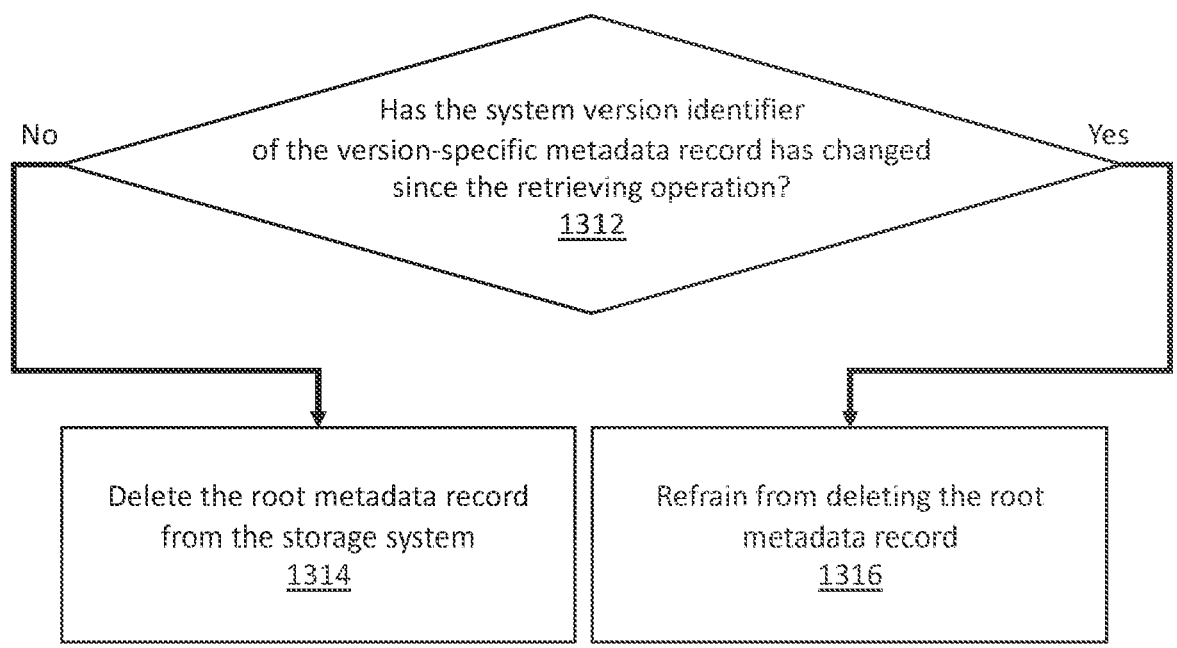

Referring back to FIG. 12, if the particular version of object data is the only version of object data of the object, then the CCEE attempts to delete the root metadata record for deleting the particular version of object data from the storage system (Operation 1220). Referring to FIG. 13B, FIG. 13B illustrates an example set of operations for attempting to update the metadata tier.

One or more embodiments include determining whether the system version identifier of the version-specific metadata record has changed since having been retrieved at Operation 1210 (Operation 1312). Descriptions relating to determining whether the system version identifier has changed are discussed above with reference to Operation 702.

If the system version identifier of the version-specific metadata record has not changed since having been retrieved at Operation 1210, then the CCEE 104 deletes the root metadata record from the storage system (Operation 1314). The CCEE 104 marks the root metadata record as being deleted. Additionally and/or alternatively, a garbage collection process is performed on the root metadata record to remove the root metadata record from the storage system.

However, if the system version identifier of the version-specific metadata record has changed since having been retrieved at Operation 1210, then the CCEE 104 refrains from deleting the root metadata record (Operation 1316).

In an embodiment, the storage system supports atomic transactions over only a single row, or a single shard. Since the root metadata record and the version-specific metadata record are stored in a same row or a same shard, Operations 1312-1314 are performed in a single atomic transaction. The atomic transaction may be a read-modify-write transaction that simultaneously: (a) reads from the version-specific metadata record or the root metadata record, and (b) depending on whether the value read from the version-specific metadata record or the root metadata record satisfies a condition, deletes the root metadata record.

Referring back to FIG. 12, one or more embodiments include determining whether the attempt at Operation 1218 or Operation 1220 was successful (Operation 1222). If the metadata tier was successfully updated, then the attempt was successful.

If the attempt at Operation 1218 or Operation 1220 was not successful, then the CCEE 104 refrains from deleting the particular version of object data from the storage system (Operation 1226). The CCEE 104 does not fulfill the request to delete the particular version of object data.

One or more embodiments include deleting the particular version of object data of the object from the storage system (Operation 1224). Descriptions relating to deleting a particular version of object data are discussed above with reference to Operation 822.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
   receiving a first conditional command to store a particular version of object data of a first object in a storage system, if any version of the object data of the first object already exists in the storage system;
   determining that at least one version of the object data of the first object already exists in the storage system;
   responsive to determining that the at least one version of the object data of the first object already exists in the storage system, storing the particular version of the object data of the first object in the storage system.

2. The one or more non-transitory machine-readable media of claim 1, wherein determining that at least one version of the object data of the first object already exists in the storage system comprises:
   generating a key corresponding to the first object;
   determining that a root metadata record corresponding to the key is already stored in the storage system.

3. The one or more non-transitory machine-readable media of claim 2, wherein determining that the root metadata record corresponding to the key is already stored in the storage system comprises:
   performing an attempt at updating the root metadata record corresponding to the key;
   determining that the attempt at updating the root metadata record corresponding to the key was successful.

4. The one or more non-transitory machine-readable media of claim 3, wherein updating the root metadata record corresponding to the key comprises:
   storing, in the storage system, version-specific metadata corresponding to the particular version of the object data of the first object.

5. The one or more non-transitory machine-readable media of claim 4, wherein storing the version-specific metadata in the storage system comprises storing the version-specific metadata in the root metadata record.

6. The one or more non-transitory machine-readable media of claim 4, wherein storing the version-specific metadata in the storage system comprises storing the version-specific metadata in a metadata tier entry separate from the root metadata record.

7. The one or more non-transitory machine-readable media of claim 6, wherein the metadata tier entry is stored in a same shard as the root metadata record.

8. The one or more non-transitory machine-readable media of claim 3, wherein updating the root metadata record corresponding to the key comprises:
   storing, in the root metadata record, a data version identifier corresponding to the particular version of the object data of the first object.

9. The one or more non-transitory machine-readable media of claim 8, wherein a single atomic operation performs (a) determining that the root metadata record corresponding to the key is already stored in the storage system and (b) storing, in the root metadata record, a data version identifier corresponding to the particular version of the object data of the first object.

10. The one or more no-transitory machine-readable media of claim 9, wherein the single atomic operation further performs storing, in the root metadata record, version-specific metadata corresponding to the particular version of the object data of the first object.

11. The one or more non-transitory machine-readable media of claim 8, wherein the data version identifier is based on at least a time when the root metadata record is being updated.

12. The one or more non-transitory machine-readable media of claim 8, wherein the data version identifier is based on at least an increment from the at least one version of the object data of the first object that already exists in the storage system.

13. The one or more non-transitory machine-readable media of claim 2, wherein generating the key corresponding to the first object is based on at least an object name of the object.

14. The one or more non-transitory machine-readable media of claim 2, wherein generating the key corresponding to the first object is based on at least a root version identifier associated with one or more root metadata records in the storage system.

15. The one or more non-transitory machine-readable media of claim 1, the operations further comprising:
receiving a second conditional command to store a particular version of object data of a second object in the storage system, if any version of the object data of the second object already exists in the storage system;
determining that no version of the object data of the second object already exists in the storage system;
responsive to determining that no version of the object data of the second object already exists in the storage system, refraining from storing the particular version of the object data of the second object in the storage system.

16. The one or more non-transitory machine-readable media of claim 1, the operations further comprising:
receiving a second conditional command to store a second particular version of the object data of the first object in the storage system, if any version of the object data of the first object already exists in the storage system;
determining that at least the particular version of the object data of the first object already exists in the storage system;
responsive to determining that at least the particular version of the object data of the first object already exists in the storage system, storing the second particular version of the object data of the first object in the storage system.

17. The one or more non-transitory machine-readable media of claim 1, wherein the storage system comprises a database configured to perform atomic read-modify-write transactions over a single row or shard.

18. The one or more non-transitory machine-readable media of claim 1, wherein:
determining that at least one version of the object data of the first object already exists in the storage system comprises:
generating a key corresponding to the first object;
determining that a root metadata record corresponding to the key is already stored in the storage system;
determining that the root metadata record corresponding to the key is already stored in the storage system comprises:
performing an attempt at updating the root metadata record corresponding to the key;
determining that the attempt at updating the root metadata record corresponding to the key was successful;
updating the root metadata record corresponding to the key comprises storing, in the storage system, version-specific metadata corresponding to the particular version of the object data of the first object.
storing the version-specific metadata in the storage system comprises storing the version-specific metadata in at least one of the root metadata record or a metadata tier entry separate from the root metadata record;
the metadata tier entry is stored in a same shard as the root metadata record;
updating the root metadata record corresponding to the key comprises storing, in the root metadata record, a data version identifier corresponding to the particular version of the object data of the first object;
a single atomic operation performs (a) determining that the root metadata record corresponding to the key is already stored in the storage system, (b) storing, in the root metadata record, a data version identifier corresponding to the particular version of the object data of the first object, and (c) storing, in the root metadata record, version-specific metadata corresponding to the particular version of the object data of the first object;
the data version identifier is based on at least one or more of (a) a time when the root metadata record is being updated or (b) an increment from the at least one version of the object data of the first object that already exists in the storage system;
generating the key corresponding to the first object is based on at least one or more of (a) an object name of the object or (b) a root version identifier associated with one or more root metadata records in the storage system;
the operations further comprising:
receiving a second conditional command to store a particular version of object data of a second object in the storage system, if any version of the object data of the second object already exists in the storage system;
determining that no version of the object data of the second object already exists in the storage system;
responsive to determining that no version of the object data of the second object already particular version of object data of a second object exists in the storage system, refraining from storing the first particular version of the object data of the second object in the storage system;
receiving a third conditional command to store a second particular version of the object data of the first object in the storage system, if any version of the object data of the first object already exists in the storage system;
determining that at least the particular version of the object data of the first object already exists in the storage system;
responsive to determining that at least the particular version of the object data of the first object already exists in the storage system, storing the second particular version of the object data of the first object in the storage system;
wherein the storage system comprises a database configured to perform atomic read-modify-write transactions over a single row or shard.

19. A system comprising:
at least one device comprising one or more hardware processors,
the system being configured to perform operations comprising:
receiving a first conditional command to store a particular version of object data of a first object in a storage system, if any version of the object data of the first object already exists in the storage system;
determining that at least one version of the object data of the first object already exists in the storage system;
responsive to determining that the at least one version of the object data of the first object already exists in the storage system, storing the particular version of the object data of the first object in the storage system.

20. A method comprising:
receiving a first conditional command to store a particular version of object data of a first object in a storage system, if any version of the object data of the first object already exists in the storage system;
determining that at least one version of the object data of the first object already exists in the storage system;
responsive to determining that the at least one version of the object data of the first object already exists in the storage system, storing the particular version of the object data of the first object in the storage system, wherein the method is performed by at least device comprising one or more hardware processors.

* * * * *

UNITED STATES PATENT AND TRADEMARK OFFICE
CERTIFICATE OF CORRECTION

PATENT NO. : 11,599,504 B2
APPLICATION NO. : 17/836219
DATED : March 7, 2023
INVENTOR(S) : Aditya Sawhney Page 1 of 1

It is certified that error appears in the above-identified patent and that said Letters Patent is hereby corrected as shown below:

In the Specification

In Column 24, Line 18, after "retrieves," delete "from".

In the Claims

In Column 32, Line 45, in Claim 10, delete "no-transitory" and insert -- non-transitory --, therefor.

In Column 33, Line 51, in Claim 18, delete "object." and insert -- object; --, therefor.

Signed and Sealed this
Second Day of January, 2024

Katherine Kelly Vidal
*Director of the United States Patent and Trademark Office*